United States Patent
Okuyoshi et al.

(10) Patent No.: US 8,691,458 B2
(45) Date of Patent: Apr. 8, 2014

(54) FUEL CELL SYSTEM

(75) Inventors: Masahiro Okuyoshi, Toyota (JP);
Masaaki Matsusue, Mishima (JP);
Masashi Toida, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 377 days.

(21) Appl. No.: 13/106,629

(22) Filed: May 12, 2011

(65) Prior Publication Data

US 2011/0217611 A1    Sep. 8, 2011

Related U.S. Application Data

(63) Continuation of application No. PCT/JP2008/073793, filed on Dec. 26, 2008.

(51) Int. Cl.
*H01M 8/06* (2006.01)
*H01M 8/04* (2006.01)

(52) U.S. Cl.
USPC .......................................... 429/429; 429/413

(58) Field of Classification Search
USPC ........................................................ 429/429
See application file for complete search history.

(56) References Cited

U.S. PATENT DOCUMENTS

| | | | |
|---|---|---|---|
| 6,120,925 A | 9/2000 | Kawatsu et al. | |
| 6,960,401 B2 * | 11/2005 | Barton et al. | 429/432 |
| 6,964,824 B2 | 11/2005 | Enjoji et al. | |
| 2002/0009623 A1 | 1/2002 | St-Pierre et al. | |
| 2002/0180448 A1 * | 12/2002 | Imamura et al. | 324/439 |
| 2002/0192520 A1 | 12/2002 | Nonobe | |
| 2005/0053814 A1 | 3/2005 | Imamura et al. | |
| 2007/0092771 A1 * | 4/2007 | Wake et al. | 429/22 |
| 2007/0172720 A1 | 7/2007 | Mogi et al. | |
| 2011/0244350 A1 | 10/2011 | Okuyoshi et al. | |

FOREIGN PATENT DOCUMENTS

| | | |
|---|---|---|
| JP | 2002-164069 A | 6/2002 |
| JP | 2002-231283 A | 8/2002 |
| JP | 2002-280027 A | 9/2002 |
| JP | 2003-331886 A | 11/2003 |
| JP | 2004-039551 A | 2/2004 |
| JP | 2004-111196 A | 4/2004 |

(Continued)

OTHER PUBLICATIONS

International Search Report for PCT/JP2008/073782 dated Apr. 28, 2009.

(Continued)

*Primary Examiner* — Ula C Ruddock
*Assistant Examiner* — Matthew Van Oudenaren
(74) *Attorney, Agent, or Firm* — Kenyon & Kenyon LLP

(57) ABSTRACT

It is an object of the invention to improve the accuracy of estimating a moisture content and suppress an effect of remaining water at the startup of the fuel cell system.
A fuel cell system includes: a fuel cell including a cell laminate; an estimating unit for estimating a residual water content distribution in the reactant gas flow channel and a moisture content distribution in the electrolyte membrane in a cell plane of each single cell while taking into consideration water transfer that occurs between the anode electrode and the cathode electrode via the electrolyte membrane; and an operation control unit for, based on an estimation result from the estimating unit, setting a scavenging time used in a scavenging process for the fuel cell after the fuel cell system is shut down.

8 Claims, 19 Drawing Sheets

(56) References Cited

FOREIGN PATENT DOCUMENTS

| | | | | |
|---|---|---|---|---|
| JP | 2004-146236 A | 5/2004 | | |
| JP | 2004-146267 A | 5/2004 | | |
| JP | 2004-207139 A | 7/2004 | | |
| JP | 2004-335444 A | 11/2004 | | |
| JP | 2005-222854 A | 8/2005 | | |
| JP | 2006-073427 A | 3/2006 | | |
| JP | 2006100093 | * | 4/2006 | .............. H01M 8/04 |
| JP | 2006-120342 A | 5/2006 | | |
| JP | 2006-156059 A | 6/2006 | | |
| JP | 2006-156411 A | 6/2006 | | |
| JP | 2006-196262 A | 7/2006 | | |
| JP | 2006-202696 A | 8/2006 | | |
| JP | 2006-236862 A | 9/2006 | | |
| JP | 2006-526271 A | 11/2006 | | |
| JP | 2007-035389 A | 2/2007 | | |
| JP | 2007-048650 A | 2/2007 | | |
| JP | 2007-141812 A | 6/2007 | | |
| JP | 2007-149572 A | 6/2007 | | |
| JP | 2007-172953 A | 7/2007 | | |
| JP | 2007-173071 A | 7/2007 | | |
| JP | 2007-207560 A | 8/2007 | | |
| JP | 2007-207725 A | 8/2007 | | |
| JP | 2007-227212 A | 9/2007 | | |
| JP | 2007-287547 A | 11/2007 | | |
| JP | 2007-288850 A | 11/2007 | | |
| JP | 2007-305420 A | 11/2007 | | |
| JP | 2008-034136 A | 2/2008 | | |
| JP | 2008-041505 A | 2/2008 | | |
| JP | 2008-041625 A | 2/2008 | | |
| JP | 2008-091329 A | 4/2008 | | |
| JP | 2008-130444 A | 6/2008 | | |
| JP | 2008-140734 A | 6/2008 | | |
| JP | 2008-251489 A | 10/2008 | | |
| JP | 2008-282616 A | 11/2008 | | |
| JP | 2008-293805 A | 12/2008 | | |
| JP | 2009-004151 A | 1/2009 | | |

OTHER PUBLICATIONS

International Search Report for PCT/JP2008/073784 dated Apr. 28, 2009.
International Search Report for PCT/JP2008/073786 dated Apr. 28, 2009.
International Search Report for PCT/JP2008/073791 dated Apr. 28, 2009.
English Translation of IPRP for PCT/JP2008/073791 dated Aug. 16, 2011.
Office Action for U.S. Appl. No. 13/163,315 dated Oct. 24, 2011.
Final Office Action for U.S. Appl. No. 13/163,315 dated Jan. 27, 2012.
Advisory Action for U.S. Appl. No. 13/163,315 dated Apr. 4, 2012.
Office Action for U.S. Appl. No. 13/163,315 dated Sep. 17, 2012.
Office Action for U.S. Appl. No. 13/163,381 dated Oct. 26, 2011.
Final Office Action for U.S. Appl. No. 13/163,381 dated Mar. 28, 2012.
Office Action for U.S. Appl. No. 13/163,234 dated Nov. 8, 2011.
Office Action for U.S. Appl. No. 13/163,234 dated Apr. 11, 2011.
Final Office Action for U.S. Appl. No. 13/163,234 dated Oct. 5, 2012.
Office Action for U.S. Appl. No. 13/163,083 dated Nov. 9, 2011.
Office Action mailed on Sep. 30, 2013, in U.S. Appl. No. 13/163,234.

\* cited by examiner

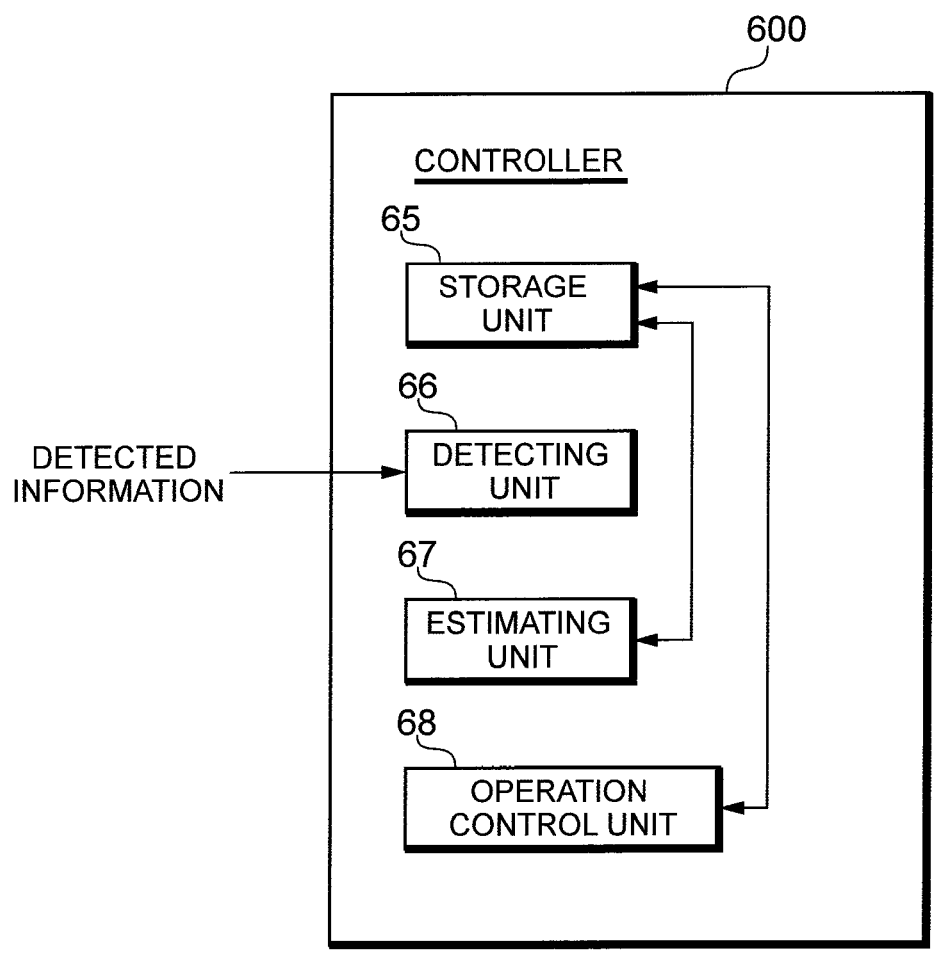

FIG. 8

S1 — READ CURRENT VALUE I, CELL INLET TEMPERATURE $T_{in, i}$, CELL OUTLET TEMPERATURE $T_{OUT, i}$, AIR FLOW RATE $Q_{air, i}$, HYDROGEN FLOW RATE $Q_{H2, i}$, AIR BACK PRESSURE $P_{air, i}$, and HYDROGEN PRESSURE $P_{H2, i}$

S2 — CALCULATE CATHODE INLET DEW POINT $T_{d, CA}$ AND ANODE INLET DEW POINT $T_{d, AN}$ OF SINGLE CELL FROM CELL INLET TEMPERATURE $T_{in, i}$

S3 — DETERMINE WATER TRANSFER RATE $V_{H2O, CA \to AN}$ BETWEEN ELECTRODES 24A, 24B
$V_{H2O, CA \to AN} = D_{H2O} \times (P_{H2O, CA} - P_{H2O, AN})$

S4 — CALCULATE CURRENT DENSITY $i_x$ (WHERE $x$ IS ANY NATURAL NUMBER) USING MAP FROM WATER TRANSFER RATE $V_{H2O, CA \to AN}$, DEW POINT $T_{d, CA}$, DEW POINT $T_{d, AN}$, TEMPERATURE $T_{OUT, i}$, AIR BACK PRESSURE $P_{air, i}$, HYDROGEN PRESSURE $P_{H2, i}$, AIR FLOW RATE $Q_{air, i}$, HYDROGEN FLOW RATE $Q_{H2, i}$, AND CURRENT VALUE I
Current DISTRIBUTION I = f ($T_{d, CA}$, $T_{d, AN}$, $T_{OUT, i}$, $P_{air, i}$, $P_{H2, i}$, $Q_{air, i}$, $Q_{H2, i}$, $V_{H2O, CA \to AN}$, $i_x$)
HUMIDITY DISTRIBUTION RH = f ($T_{d, CA}$, $T_{d, AN}$, $T_{OUT, i}$, $P_{air, i}$, $P_{H2, i}$, $Q_{air, i}$, $Q_{H2, i}$, $V_{H2O, CA \to AN}$, $i_x$)

S5 — CALCULATE DEGREE OF SUPERSATURATION $\sigma_1$ AND DEGREE OF UNDERSATURATION $\sigma_2$ (AMOUNT CORRESPONDING TO RELATIVE HUMIDITY UNDER 100%), AND CALCULATE LIQUID WATER GENERATION RATE $V_{vap \to liq}$ AND LIQUID WATER EVAPORATION RATE $V_{liq \to vap}$
$V_{vap \to liq} = k_1 \times \sigma_1$
$V_{liq \to vap} = k_2 \times \sigma_2$

S6 — CALCULATE WATER TRANSFER RATE V_liq IN REACTANT GAS FLOW CHANNEL
$V\_liq = k_3 \times V\_gas$

FIG. 14

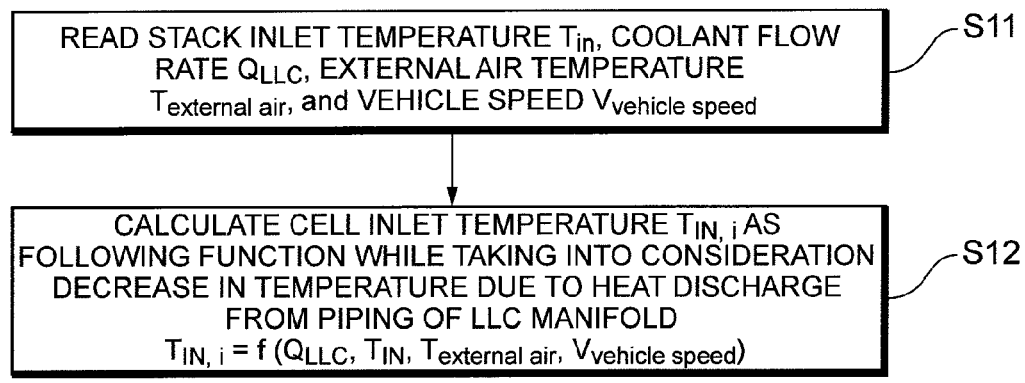

S11: READ STACK INLET TEMPERATURE $T_{in}$, COOLANT FLOW RATE $Q_{LLC}$, EXTERNAL AIR TEMPERATURE $T_{external\ air}$, and VEHICLE SPEED $V_{vehicle\ speed}$ S12: CALCULATE CELL INLET TEMPERATURE $T_{IN,\ i}$ AS FOLLOWING FUNCTION WHILE TAKING INTO CONSIDERATION DECREASE IN TEMPERATURE DUE TO HEAT DISCHARGE FROM PIPING OF LLC MANIFOLD
$T_{IN,\ i} = f(Q_{LLC}, T_{IN}, T_{external\ air}, V_{vehicle\ speed})$

FIG. 15A

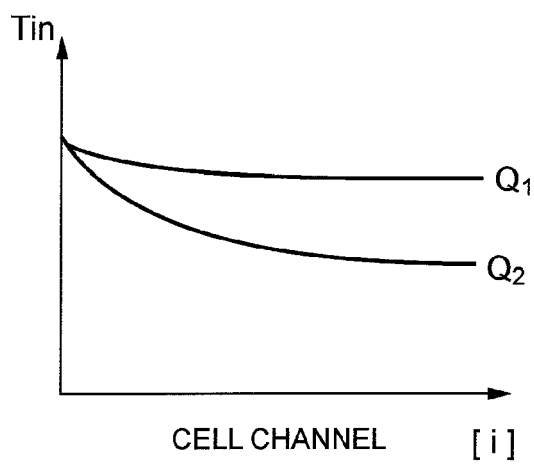

FIG. 15B

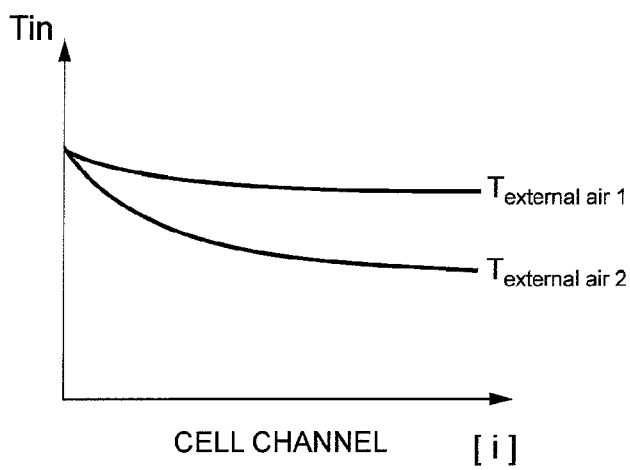

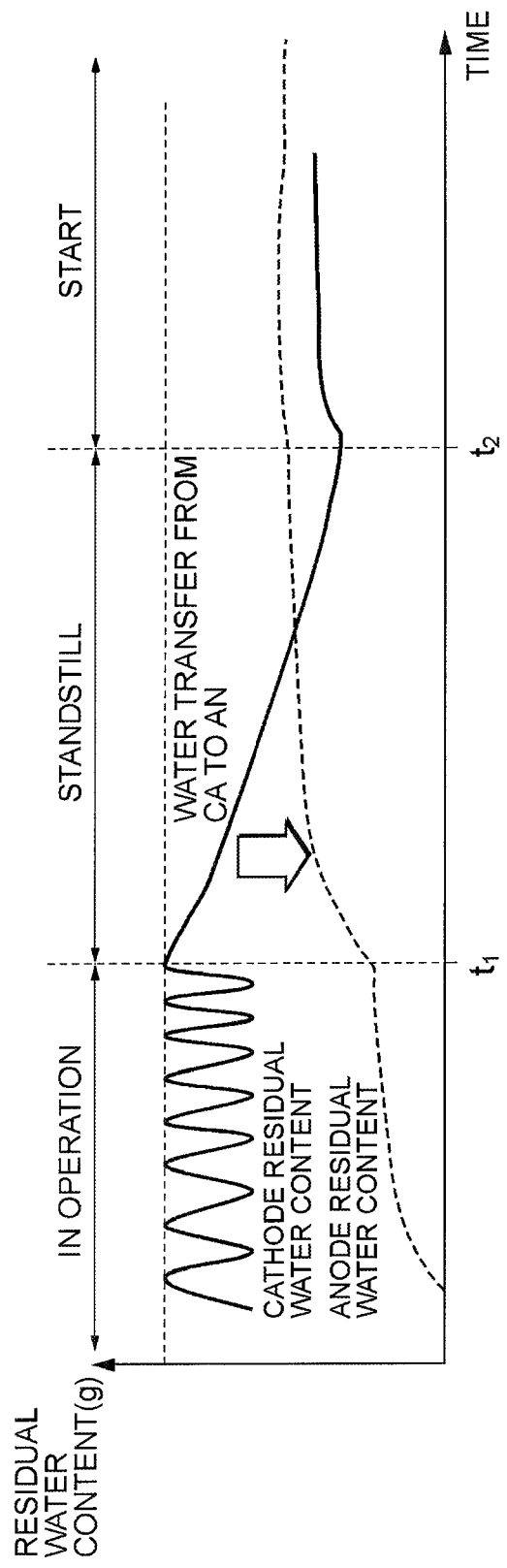

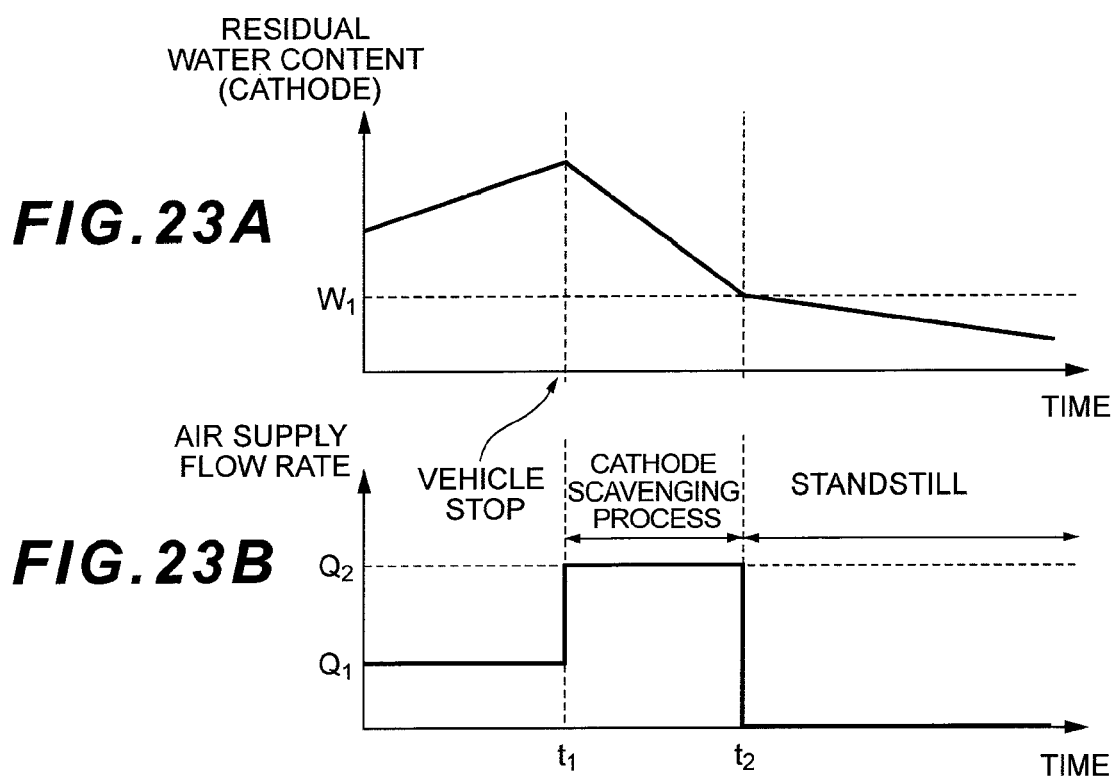

FUEL CELL SYSTEM

This is a by-pass continuation of International Application No. PCT/JP2008/073793 filed 26 Dec. 2008, the content of which is incorporated herein by reference.

FIELD OF THE INVENTION

The present invention relates to a fuel cell system using estimation of a moisture content in a proton-exchange membrane fuel cell.

BACKGROUND OF THE INVENTION

As conventionally well-known, in order to efficiently generate electricity in a proton-exchange membrane fuel cell, it is desirable to keep the electrolyte membrane moderately wet and avoid an excessive or insufficient moisture content in the fuel cell. There is a known technique of controlling a moisture content in a cell plane of a fuel cell, as described in Patent Document 1 (Japanese Patent Laid-Open No. 2004-335444), for example. Patent Document 1 discloses adjusting one of pressure drop characteristics due to pressure, humidity, temperature, flow rate, and flow channel geometry of reactant gas, which is a general term for oxidation gas represented by air and fuel gas represented by hydrogen gas, to control the distribution of moisture content present in the cell plane as droplet or water vapor.

SUMMARY OF THE INVENTION

Problems to be Solved by the Invention

In an actual single cell, however, there is transfer of moisture through the electrolyte membrane between the anode electrode and the cathode electrode. In this respect, since the water transfer between electrodes is not taken into consideration in Patent Document 1, it is difficult to accurately estimate and control a moisture content distribution in the cell plane.

Particularly after fuel cell system shutdown, accumulated water on the cathode electrode side moves to the anode electrode side due to water vapor partial pressure difference (temperature difference). As a result, when the fuel cell system should be started again, a flow channel on the anode electrode side may have a large amount of residual water content and therefore a high pressure drop. If the fuel cell system is started in this state, supply of hydrogen gas to the anode electrode may be insufficient, so that cell voltage may be dropped.

A fuel cell system according to the present invention has been made in view of the above problems, and an object of the fuel cell system is to improve the accuracy of estimating a moisture content and suppress an effect of remaining water at the startup of the fuel cell system.

Means for Solving the Problems

To attain the above object, a fuel cell system according to the present invention includes: a fuel cell including a cell laminate composed of a plurality of single cells laminated together, each of the single cells having an anode electrode, a cathode electrode, and an electrolyte membrane located therebetween; an estimating unit for estimating a residual water content distribution in the reactant gas flow channel and a moisture content distribution in the electrolyte membrane in a cell plane of each single cell while taking into consideration water transfer that occurs between the anode electrode and the cathode electrode via the electrolyte membrane; and an operation control unit for, based on an estimation result from the estimating unit, setting a scavenging time used in a scavenging process for the fuel cell after the fuel cell system is shut down.

According to the present invention, since water transfer between the electrodes is taken into consideration, the accuracy of estimating a water content and a residual water content can be improved. Further, since the improved estimation result is used, a scavenging time can be optimized. As a result, since a residual water content can be reduced in an appropriate scavenging process before the fuel cell system is restarted, remaining water-induced effects such as insufficient supply of reactant gas and cell voltage drop can be suppressed.

In the following description, shutdown of a fuel cell system may be abbreviated as "system shutdown" and startup and restart of the fuel cell system may be abbreviated as "system startup" and "system restart," respectively.

Preferably, the operation control unit may set a scavenging time based on the estimated residual water content in the reactant gas flow channel.

In this way, based on the residual water content that has a direct effect on the supply of reactant gas at the time of system restart, a more accurate, or necessary and sufficient, scavenging time can be set.

More preferably, the reactant gas flow channel may have a fuel gas flow channel for supplying fuel gas to the anode electrode and an oxidation gas flow channel for supplying oxidation gas to the cathode electrode. The estimating unit may estimate a residual water content distribution in the cell plane for each of the fuel gas flow channel and the oxidation gas flow channel. The operation control unit may set a scavenging time based on at least one of the estimated residual water content in the fuel gas flow channel, the estimated residual water content in the oxidation gas flow channel, and total amount thereof.

In this way, a scavenging time can be set depending on the level of each residual water content and the scavenging time can be optimized.

More preferably, even when all of the estimated remaining water in single cells has transferred to the anode electrode side, the operation control unit may perform scavenging processes until the transferred residual water content reaches a value at which cell voltage drop may not occur.

In this way, even when all of remaining water in single cells has transferred to the anode electrode side at the time of system restart, cell voltage drop can be avoided. Therefore, degradation of the single cell can be suppressed.

In this case, the operation control unit preferably perform the scavenging process with reference to estimated remaining water in a single cell at an end of the cell laminate (hereinafter referred to an "end cell").

In this way, since the scavenging process is performed with reference to the end cell where the largest amount of residual water content tends to gather in the cell laminate, a residual water content in other single cells is reliably reduced in addition to the end cell.

More preferably, the estimating unit may estimate the residual water content distribution even during the scavenging process and the operation control unit may terminate the scavenging process when a residual water content estimated during the scavenging process falls below a predetermined threshold.

In this way, a residual water content can be reduced on the basis of the progress of the scavenging process and a scavenging time can be further optimized.

More preferably, the operation control unit may perform the scavenging process on the oxidation gas flow channel or the fuel gas flow channel.

By performing a scavenging process on the oxidation gas flow channel, the amount of liquid water moving from the oxidation gas flow channel to the fuel gas flow channel after system shutdown can be reduced. On the other hand, by performing a scavenging process on the fuel gas flow channel, the amount of liquid water in the fuel gas flow channel after system shutdown can be reduced, so that a residual water content in the fuel gas flow channel can be reduced before system restart. In either case, therefore, insufficient supply of fuel gas can be suppressed at the time of system restart.

BRIEF DESCRIPTION OF THE DRAWINGS

FIG. 7 is a functional block diagram of a controller according to the embodiment;

FIG. 8 is a flow chart showing a method for estimating a water distribution in a cell plane according to the embodiment;

FIG. 14 is a flow chart showing a method for calculating the cell inlet temperature according to the embodiment;

FIG. 15A shows an effect of heat radiation on the stack inlet temperature as a relation between the location of a single cell and coolant flow rate, according to the embodiment;

FIG. 15B shows an effect of heat radiation on the stack inlet temperature as a relation between the location of a single cell and ambient temperature, according to the embodiment;

FIG. 21 shows an example of changes in a residual water content in the single cell over time without implementing the control example according to the embodiment;

FIG. 23 is a timing chart illustrating a scavenging process after system shutdown according to the control example of the embodiment;

DETAILED DESCRIPTION

Hereinafter, a preferred embodiment of the present invention will be described with reference to the accompanying drawings. First, an overview of a fuel cell system including a fuel cell and a water content estimation apparatus thereof for the fuel cell will be described, followed by a description of an estimation of a water content of a fuel cell and a control example using the estimation. Hereinafter, hydrogen gas will be described as an example of a fuel gas and air will be described as an example of an oxidation gas. A fuel gas and an oxidation gas may collectively be described as a reactant gas.

A. Overview of Fuel Cell

Figure 1:
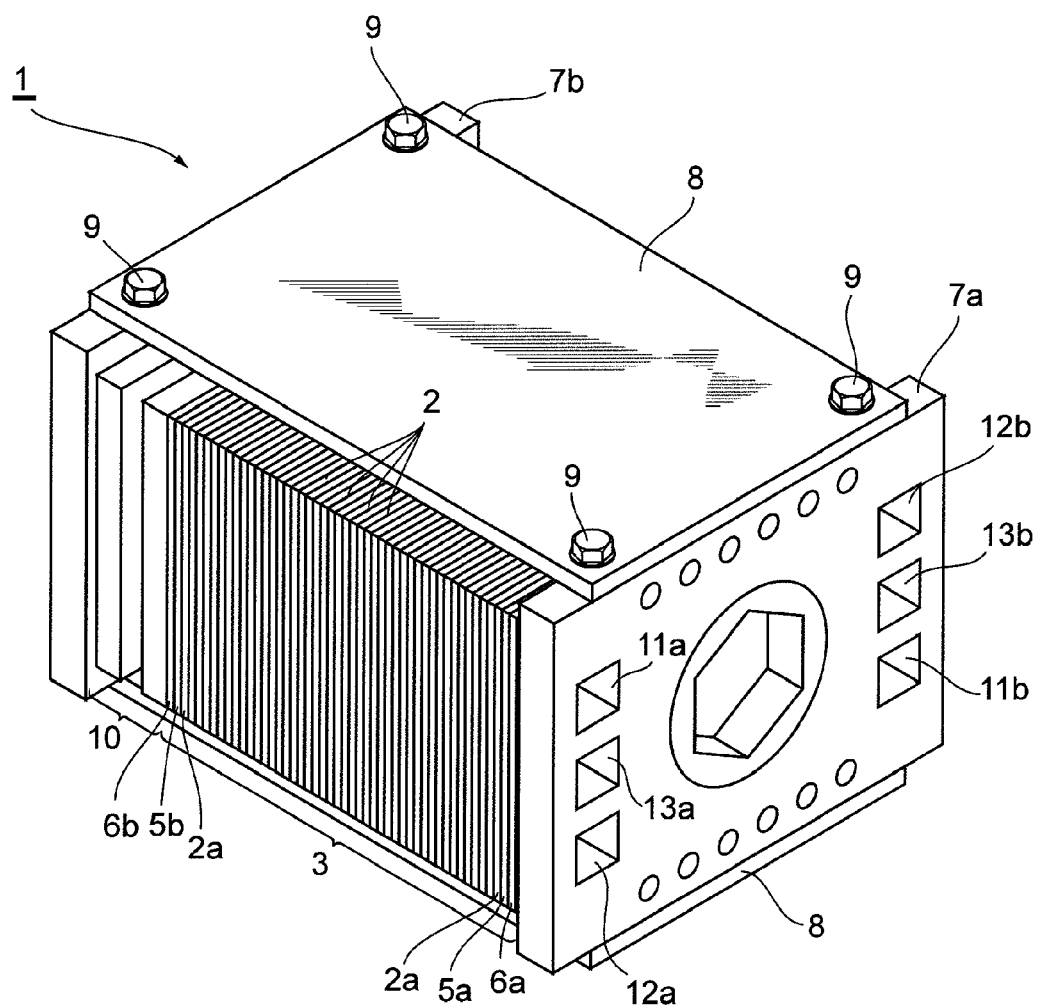
FIG. 1 is a perspective view of a fuel cell according to an embodiment.
Figure 2:
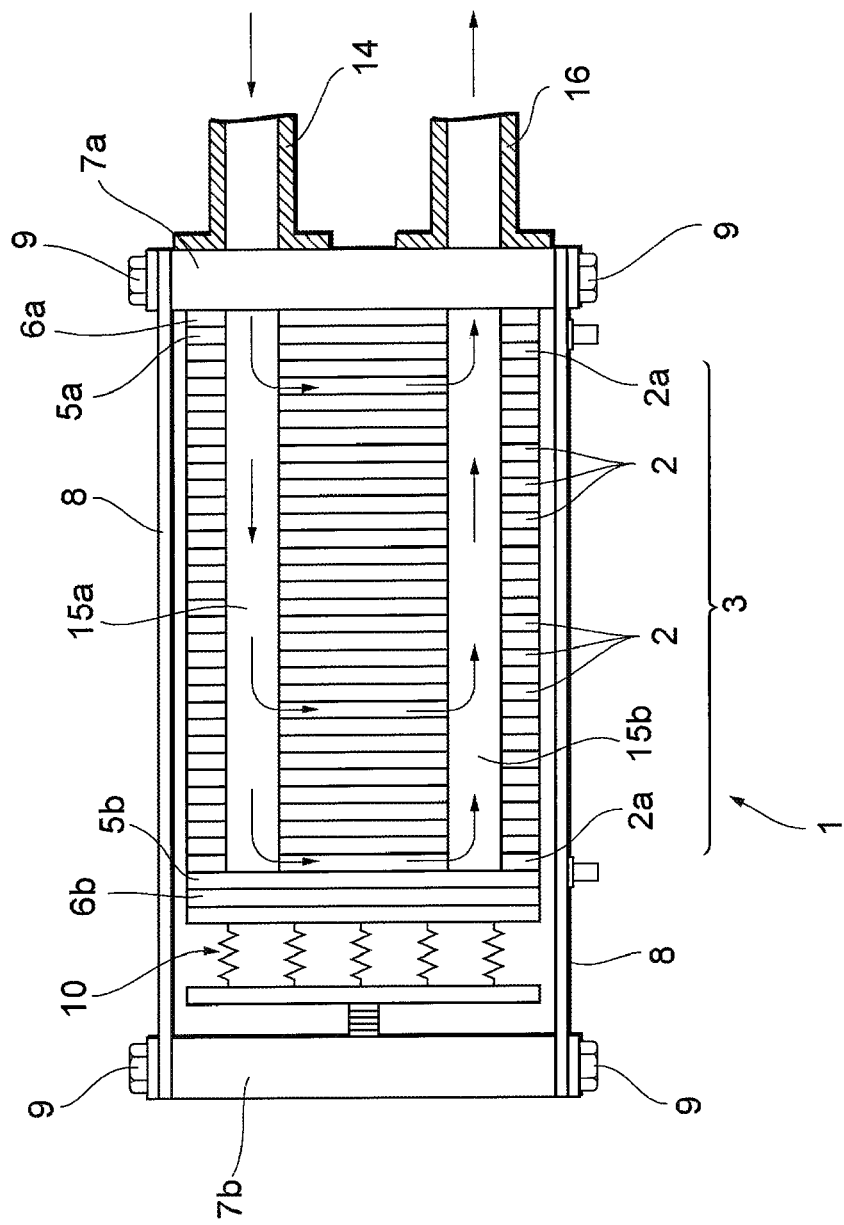
FIG. 2 is a side view showing a part of the inside of the fuel cell according to the embodiment.

As illustrated in FIGS. 1 and 2, a fuel cell 1 with a stack structure includes a cell laminate 3 formed by laminating a plurality of single cells 2 of the proton-exchange membrane type. Collector plates 5a, 5b, insulating plates 6a, 6b, and end-plates 7a, 7b are respectively arranged on outer sides of single cells 2 on both ends of the cell laminate 3 (hereinafter, referred to as "end cells 2a"). Tension plates 8, 8 are bridged across the end-plates 7a, 7b and fixed by a bolt 9. An elastic module 10 is provided between the end-plate 7b and the insulating plate 6b.

Hydrogen gas, air, and a coolant are supplied to a manifold 15a inside the cell laminate 3 from a supply pipe 14 connected to supply ports 11a, 12a, and 13a of the end-plate 7a. Subsequently, the hydrogen gas, air, and the coolant flow in a planar direction of the single cell 2 and reach a manifold 15b inside the cell laminate 3, and are discharged to the outside of the fuel cell 1 from an exhaust pipe 16 connected to exhausts 11b, 12b and 13b of the end-plate 7a. Note that although the supply pipe 14, the manifolds 15a, 15b, and the exhaust pipe 16 are provided corresponding to each fluid (hydrogen gas, air, and coolant), same reference characters are assigned in FIG. 2 and descriptions thereof are omitted.

Figure 3:
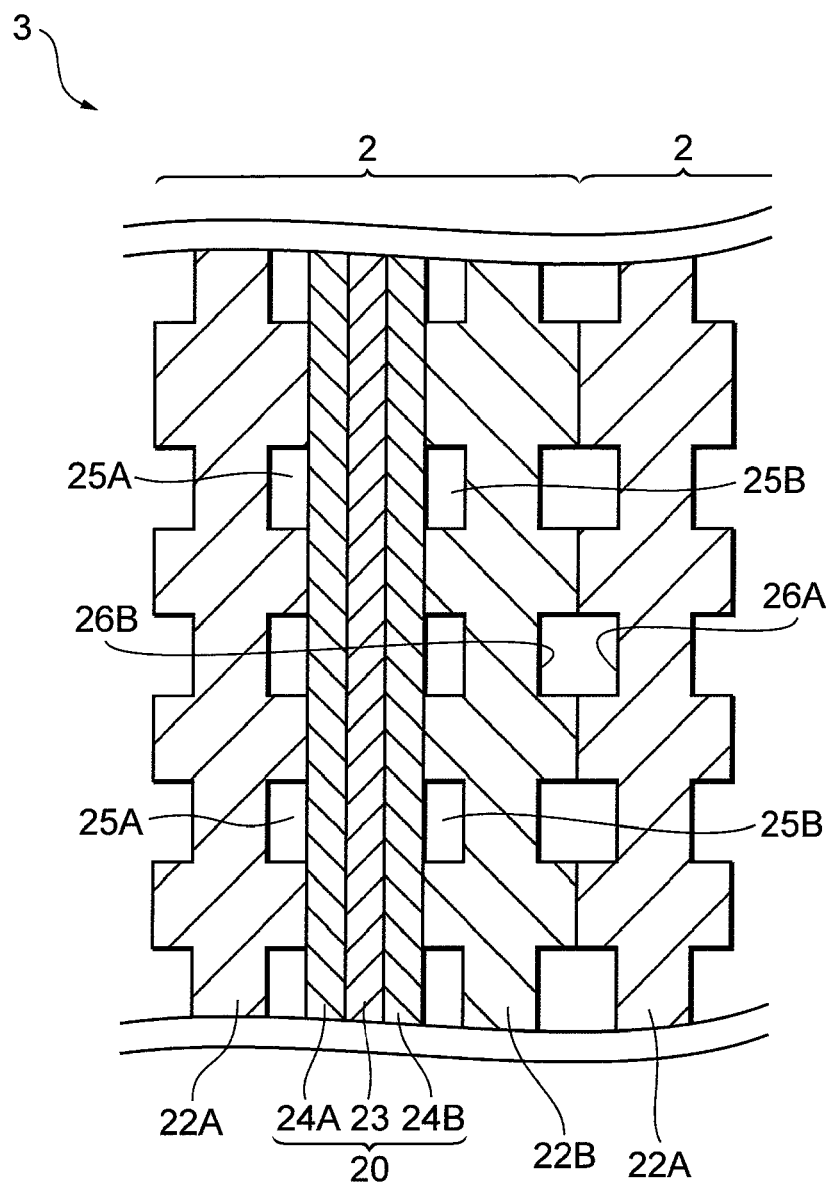
FIG. 3 is a sectional view of a single cell according to the embodiment.

As illustrated in FIG. 3, the single cell 2 includes an MEA 20 and a pair of separators 22A, 22B. The MEA 20 (Membrane Electrode Assembly) is constituted by an electrolyte membrane 23 made of an ion-exchange membrane, and an anode electrode 24A and a cathode electrode 24B which sandwich the electrolyte membrane 23. A hydrogen flow channel 25A of the separator 22A faces the electrode 24A while an air flow channel 25B of the separator 22B faces the electrode 24B. In addition, coolant flow channels 26A, 26B of the separators 22A, 22B communicate with each other between adjacent single cells 2, 2.

Figure 4:
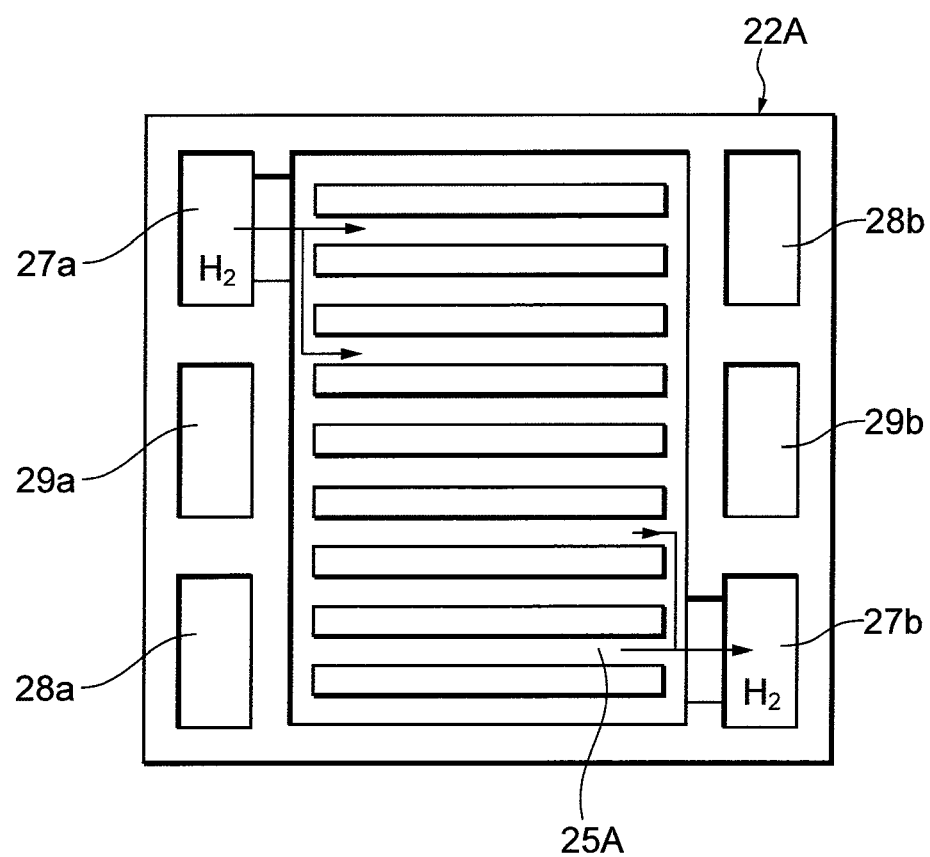
FIG. 4 is a plan view of a separator according to the embodiment.

FIG. 4 is a plan view of the separator 22A. The separator 22A includes a hydrogen inlet 27a, an air inlet 28a, a coolant inlet 29a, a hydrogen outlet 27b, an air outlet 28b, and a coolant outlet 29b respectively penetratingly formed on an outer side of the hydrogen flow channel 25A. Inlets 27a, 28a, and 29a constitute a part of the manifold 15a that corresponds to each fluid. In the same manner, outlets 27b, 28b, and 29b constitute a part of the manifold 15b that corresponds to each fluid.

At the separator 22A, hydrogen gas is introduced into a hydrogen flow channel 40 from the inlet 27a and discharged to the outlet 27b. The coolant flows in a similar manner. In addition, while a detailed description will not be given, air also flows in a planar direction in the separator 22B configured similar to the separator 22A. In this manner, hydrogen gas and air are supplied to the electrodes 24A, 24B in the single cell 2 to cause an electrochemical reaction inside the MEA 20 which produces electromotive force. Furthermore, the electrochemical reaction also generates water and heat on the side of the electrode 24B. The heat at each single cell 2 is reduced due to subsequent flow of the coolant.

Figure 5A:
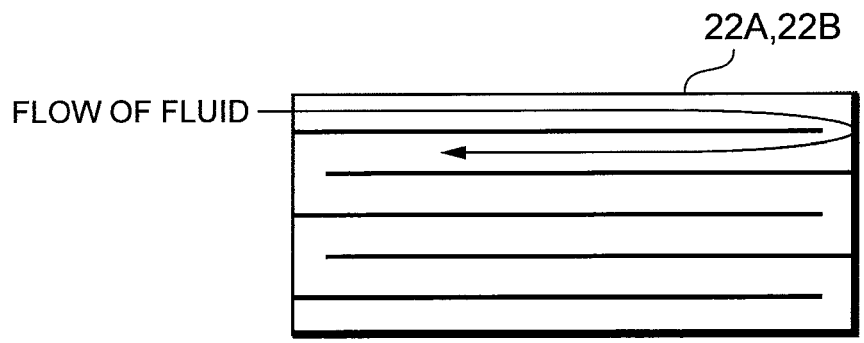
FIG. 5A is a schematic plan view showing a flow channel geometry of a separator according to a first variant of the embodiment.
Figure 5B:
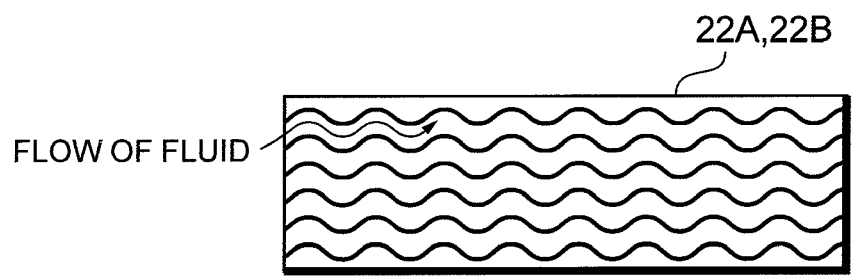
FIG. 5B is a schematic plan view showing a flow channel geometry of a separator according to a second variant of the embodiment.
Figure 5C:
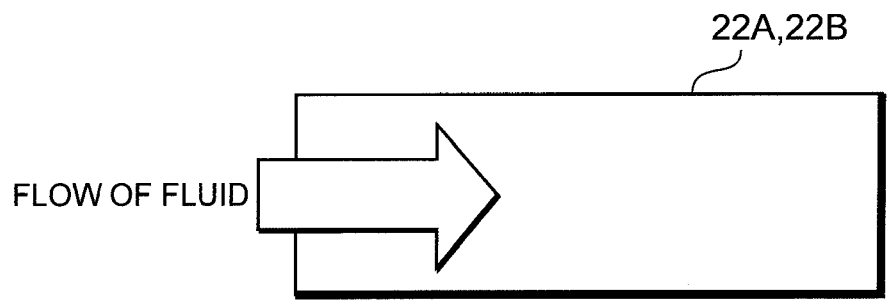
FIG. 5C is a schematic plan view showing a flow channel geometry of a separator according to a third variant of the embodiment.

FIGS. 5A to 5C are schematic plan views illustrating other flow channel geometries of a separator to which the present embodiment is applicable. In place of the mode of the straight gash flow channel (repetitive concavities and convexities extending in a single direction) illustrated in FIG. 4, the flow channel geometries of the flow channels 25A, 25B, 26A, and 26B can take a serpentine flow channel shape having folded portions midway as illustrated in FIG. 5A. In addition, as illustrated in FIG. 5B, the flow channels 25A, 25B, 26A, and 26B can take a wavy form or, as illustrated in FIG. 5C, a flat plate-like form without concavities and convexities. Furthermore, as for the flow pattern of the reactant gas, a counter-flow type in which hydrogen gas and air flow in opposite directions may be adopted in place of the coflow type (in which hydrogen gas and air flow in the same direction) as can be understood from FIGS. 1 and 4. Moreover, the separators 22A, 22B may be oriented either vertically or horizontally. In other words, estimation of a water content of the fuel cell 1 to be described later is not limited to a hardware configuration of the fuel cell 1.

B. Overview of Fuel Cell System

Figure 6:
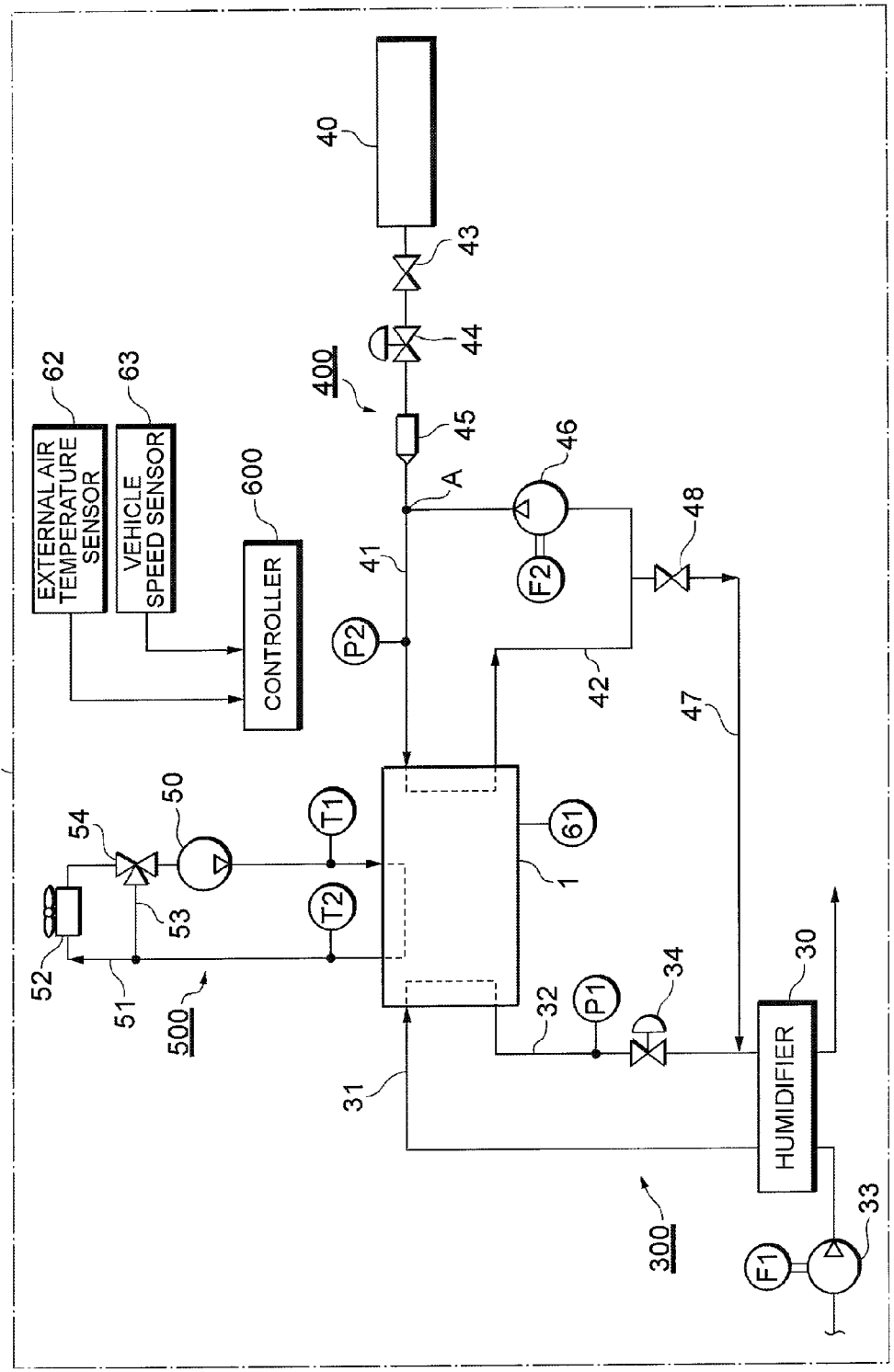
FIG. 6 is a diagram of a fuel cell system according to the embodiment.

As illustrated in FIG. 6, a fuel cell system 100 includes an air piping system 300, a hydrogen piping system 400, a coolant piping system 500, and a controller 600. In addition to being mountable on various mobile objects such as a vehicle, a ship, an airplane, and a robot, the fuel cell system 100 is applicable to a stationary power source. Here, an example of the fuel cell system 100 mounted on a vehicle will be described.

The air piping system 300 is responsible for supplying air to and discharging air from the fuel cell 1, and includes a humidifier 30, a supply flow channel 31, an exhaust flow channel 32, and a compressor 33. Atmospheric air (air in a low moisture condition) is taken in by the compressor 33 and force-fed to the humidifier 30. Water exchange between atmospheric air and an oxidation off-gas in a high moisture condition is performed at the humidifier 30. As a result, adequately humidified air is supplied from the supply flow channel 31 to the fuel cell 1. A back pressure valve 34 for regulating an air back pressure of the fuel cell 1 is provided at the exhaust flow channel 32. In addition, a pressure sensor P1 for detecting an air back pressure is provided in the vicinity of the back pressure valve 34. A flow rate sensor F1 for detecting an air supply flow rate to the fuel cell 1 is provided at the compressor 33.

The hydrogen piping system 400 is responsible for supplying hydrogen gas to and discharging hydrogen gas from the fuel cell 1, and includes a hydrogen supply source 40, a supply flow channel 41, a circulatory flow channel 42, a shut valve 43, and the like. After hydrogen gas from the hydrogen supply source 40 is depressurized by a regulator 44, a flow rate and pressure of the hydrogen gas are regulated with high accuracy by an injector 45. Subsequently, hydrogen gas merges with a hydrogen off-gas force-fed by a hydrogen pump 46 on the circulatory flow channel 42 at a confluence A to be supplied to the fuel cell 1. A purge channel 47 with a purge valve 48 is branchingly connected to the circulatory flow channel 42. The hydrogen off-gas is discharged to the exhaust flow channel 32 by opening the purge valve 48. A pressure sensor P2 that detects a supply pressure of hydrogen gas to the fuel cell 1 is provided on a downstream-side of the confluence A. In addition, a flow rate sensor F2 is provided on the hydrogen pump 46. Moreover, in other embodiments, a fuel off-gas may be introduced to a hydrogen diluter or a gas-liquid separator may be provided at the circulatory flow channel 42.

The coolant piping system 500 is responsible for circulating a coolant (for example, cooling water) to the fuel cell 1, and includes a cooling pump 50, a coolant flow channel 51, a radiator 52, a bypass flow channel 53, and a switching valve 54. The cooling pump 50 force-feeds a coolant inside the coolant flow channel 51 into the fuel cell 1. The coolant flow channel 51 includes a temperature sensor T1 located on a coolant inlet-side of the fuel cell 1 and a temperature sensor T2 located on a coolant outlet-side of the fuel cell 1. The radiator 52 cools the coolant discharged from the fuel cell 1. The switching valve 54 is made of, for example, a rotary valve and switches coolant conduction between the radiator 52 and the bypass flow channel 53 as required.

The controller 600 is configured as a microcomputer internally provided with a CPU, a ROM, and a RAM. Detected information from the sensors (P1, P2, F1, F2, T1, and T2) that detect pressure, temperature, flow rate, and the like of fluids flowing through the respective piping systems 300, 400, and 500 are inputted to the controller 600. In addition, detected information of a current sensor 61 that detects a value of a current generated by the fuel cell 1, as well as detected information from an external air temperature sensor 62, a vehicle speed sensor 63, an accelerator opening sensor, and the like, are inputted to the controller 600. In response to such detected information and the like, the controller 600 controls the various devices (the compressor 33, the shut valve 43, the injector 45, the hydrogen pump 46, the purge valve 48, the cooling pump 50, the switching valve 54, and the like) in the system 100 so as to integrally control operations of the fuel cell system 100. Furthermore, the controller 600 reads various detected information, and estimates a water content of the fuel cell 1 using various maps stored in the ROM.

As illustrated in FIG. 7, the controller 600 includes a storage unit 65, a detecting unit 66, an estimating unit 67, and an operation control unit 68 as function blocks for estimating the water content of the fuel cell 1 and realizing control based on the estimation. The storage unit 65 stores various programs and various maps for estimating a water content of the fuel cell 1 and realizing control of the fuel cell 1. The maps are to be obtained in advance by experiment or simulation. The detecting unit 66 reads detected information of the various sensors (P1, P2, F1, F2, T1, T2, and 61 to 63) and the like. Based on an estimation result by the estimating unit 67, the operation control unit 68 transmits control instructions to the various devices and controls operation so as to place the fuel cell 1 in a desired operational state (for example, a water condition, a temperature condition, or the like). At this point, as required, the operation control unit 68 executes control that distinguishes between the anode side and the cathode side.

Based on the information acquired by the detecting unit 66, the estimating unit 67 references the various maps in the storage unit 65 to estimate a water content of the fuel cell 1. More specifically, the estimating unit 67 estimates a residual water content distribution and a moisture content distribution in a cell plane of the single cell 2 while taking into consideration water transfer that occurs between the electrodes 24A and 24B via the electrolyte membrane 23. In addition, the estimating unit 67 also estimates a residual water content distribution and a moisture content distribution of each single cell 2 in a lamination direction (hereinafter, referred to as cell lamination direction).

Here, "in a cell plane" refers to the inside of a single cell 2 in a planar direction (a direction parallel to a plane of paper of FIG. 4 and perpendicular to the cell lamination direction) of the single cell 2. "Residual water content" refers to an amount of liquid water existing in the reactant gas flow channel of the single cell 2. "Reactant gas flow channel" is a concept that collectively designates the hydrogen flow channel 25A and the air flow channel 25B. "Moisture content" refers to an amount of water contained in the electrolyte membrane 23 of the single cell 2.

C. Estimation Method of Water Content of Fuel Cell

A water content estimation method according to the present embodiment involves separately estimating a residual water content and a moisture content and, in doing so, estimating a residual water content distribution separately for the anode side and the cathode side. In addition, distributions of a residual water content and a moisture content in the cell lamination direction are estimated in addition to distributions in a cell plane. Hereinafter, firstly, an estimation method of water distribution (a residual water content distribution and a moisture content distribution) in a cell plane will be described. Subsequently, a description will be given on how temperature variation and flow distribution variation in the cell lamination direction are considered during estimation, followed by a description on a water distribution estimation method in the cell lamination direction.

1. Estimation Method of Water Distribution in a Cell Plane

As illustrated in FIG. 8, firstly, a current value I, a cell inlet temperature $T_{in, I}$, a cell outlet temperature $T_{OUT, I}$, an air flow rate $Q_{air, I}$, a hydrogen flow rate $Q_{H2, I}$, an air back pressure $P_{air, I}$, and a hydrogen pressure $P_{H2, I}$ are read (step S1).

Figure 9:
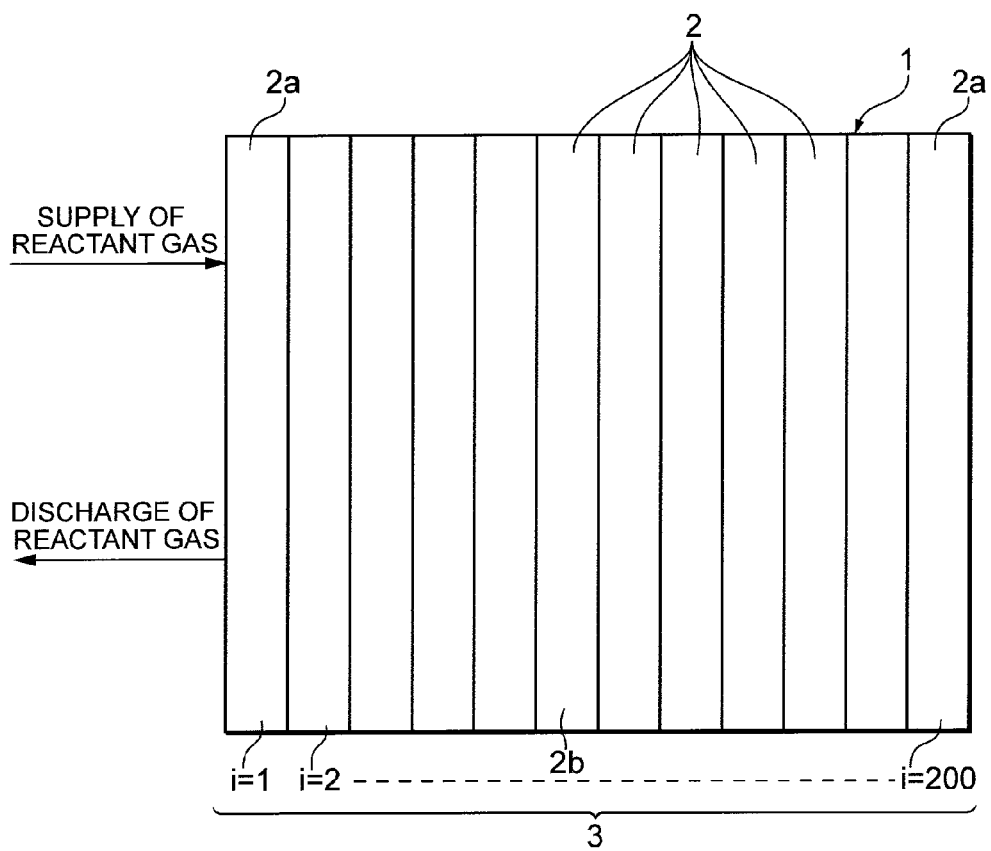
FIG. 9 shows a relation between supply/discharge of reactant gas and cell flow channels for a cell laminate according to the embodiment.

Here, the current value I is a value detected by the current sensor 61. The subscript "I" in cell inlet temperature $T_{in, I}$ and the like designates the cell channel indicating a position of the single cell 2 in the cell laminate 3. More specifically, in a case where the cell laminate 3 illustrated in FIG. 9 is taken as a model, a cell channel "I" of an end cell 2a nearest to the supply port (corresponding to the supply ports 11a and 12a in FIG. 1) and the exhaust (corresponding to the exhausts 11b and 12b in FIG. 1) of the reactant gas takes a value of 1. In a case where 200 single cells 2 are laminated, the cell channel "I" of the other end cell 2a takes a value of 200.

The cell inlet temperature $T_{in, i}$ and the cell outlet temperature $T_{OUT, i}$ respectively indicate coolant temperatures at the coolant inlet 29a and the coolant outlet 29b of the single cell 2 (cell channel: i). The air flow rate $Q_{air, i}$ and the hydrogen flow rate $Q_{H2, i}$ respectively indicate supply flow rates of air and hydrogen gas which flow into the air inlet 28a and the hydrogen inlet 27a of the single cell $2_i$. The air back pressure $P_{air, i}$ and the hydrogen pressure $P_{H2, i}$ respectively indicate pressures of air and hydrogen gas at the air outlet 28b and the hydrogen inlet 27a of the single cell $2_i$. The following applies in a case where the fuel cell has only one single cell 2 or in a case where temperature variation and flow distribution variation in the cell lamination direction are not considered.

$T_{in, i}$: detected value by the temperature sensor T1
$T_{OUT, i}$: detected value by the temperature sensor T2
$Q_{air, i}$: detected value by the flow rate sensor F1
$Q_{H2, i}$: hydrogen supply flow rate calculated from a detected value by the flow rate sensor F2
$P_{air, i}$ detected value by the pressure sensor P1
$P_{H2, i}$: detected value by the pressure sensor P2

On the other hand, in a case where the fuel cell 1 includes a plurality of single cells 2, heat discharge, pressure drop, and the like differ depending on positions in the cell lamination direction. Therefore, a heat discharge variation and flow distribution variations of the reactant gas and the coolant exist among the single cells 2. Accordingly, a cell inlet temperature $T_{in, I}$ and the like which take the above into consideration are desirably used. The method of consideration will be described later.

Values from sensors other than those described above or values calculated by other calculation methods may be used as the respective detected values used as the cell inlet temperature $T_{in, I}$ and the like. In other words, a temperature sensor, a flow rate sensor, and a pressure sensor may be provided at positions other than those illustrated in FIG. 6 and design changes to the numbers and positions thereof may be performed as appropriate. For example, a hydrogen flow rate sensor may be provided near the hydrogen supply port 11a of the fuel cell 1 and a detected value of the sensor be used as the hydrogen flow rate $Q_{H2, i}$. In addition, the cell inlet temperature $T_{in, I}$ and the cell outlet temperature $T_{OUT, I}$ can also be estimated by mounting temperature sensors to the end cell 2a or the end-plates 7a, 7b. As shown, by measuring a temperature of the fuel cell stack itself as opposed to a temperature of the coolant, water estimation can be performed with higher accuracy.

In step S2 illustrated in FIG. 8, a cathode inlet dew point $T_{d, CA}$ and an anode inlet dew point $T_{d, AN}$ of each single cell $2_i$ are calculated from the cell inlet temperature $T_{in, i}$. In the present embodiment, since the humidifier 30 is used in the fuel cell system 1, the cell inlet temperature $T_{in, I}$ can be used as the cathode inlet dew point $T_{d, CA}$ and the anode inlet dew point $T_{d, AN}$, respectively. In other words, in a case where the air inlet 28a and the hydrogen inlet 27a are close to the coolant inlet 29a, the following expression becomes true and a lamination variation of dew points can be taken into consideration.

$$T_{d,CA} = T_{d,AN} = T_{in,i}$$

Moreover, in step S2, the cathode inlet dew point $T_{d, CA}$ and the anode inlet dew point $T_{d, AN}$ of each single cell 2, can be calculated from the cell outlet temperature $T_{out, i}$. Furthermore, in another embodiment, a dew-point meter may be used. For example, in a case where a humidifier is not used in the fuel cell system 1 or in a case where the cell inlet temperature $T_{in, I}$ is not used, dew-point meters may respectively be installed at stack inlets (the anode-side supply port 11a and the cathode-side supply port 12a) of the fuel cell 1 and the detected values of the dew-point meters be set as the cathode inlet dew point $T_{d,\,CA}$ and the anode inlet dew point $T_{d,\,AN}$. Such a configuration enables estimation with higher accuracy.

In addition, in an air non-humidification system in which the humidifier 30 is not mounted on the air piping system 300, the cathode inlet dew point $T_{d,\,CA}$ may be calculated as being 0° C. Alternatively, the cathode inlet dew point $T_{d,\,CA}$ may be calculated by a function of external air temperature and external humidity using an external air temperature sensor and an external humidity sensor. In other words, the present estimation method can also be applied to a non-humidification system.

In step S3 illustrated in FIG. 8, a water transfer rate $V_{H2O,\,CA\to AN}$ between the electrodes 24A, 24B is determined. The water transfer rate $V_{H2O,\,CA\to AN}$ is calculated as follows.

$$V_{H2O,CA\to AN}=D_{H2O}\times(P_{H2O,CA}-P_{H2O,AN})$$

In the above expression, $P_{H2O,\,CA}$ is a water vapor partial pressure on the side of the electrode 24B of the single cell $2_i$ and is calculated from the cathode inlet dew point $T_{d,\,CA}$. In addition, $P_{H2O,\,AN}$ is a water vapor partial pressure on the side of the electrode 24A of the single cell $2_i$ and is calculated from the anode inlet dew point $T_{d,\,AN}$. $D_{H2O}$ denotes water diffusivity in the electrolyte membrane 23. While a constant value can be used as $D_{H2O}$, since variances occur due to humidity, such variances are desirably taken into consideration.

Figure 10:
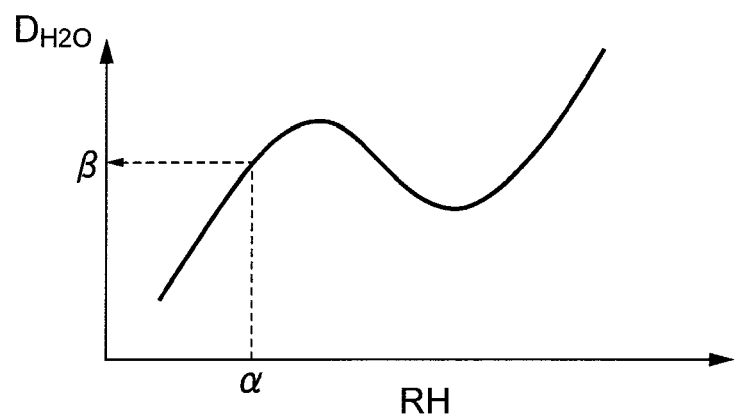
FIG. 10 is a characteristics map representing a relation between relative humidity and $D_{H2O}$ of an electrolyte membrane according to the embodiment.

For example, a characteristic map representing a relationship between a relative humidity of the electrolyte membrane 23 and $D_{H2O}$ such as that illustrated in FIG. 10 may be created in advance, and using the characteristic map, a value of $D_{H2O}$ corresponding to the relative humidity of the electrolyte membrane 23 may be used. More specifically, a value ($\beta$) of $D_{H2O}$ to be used in an upcoming estimation can be determined from the map using a relative humidity a of the electrolyte membrane 23 estimated upon shutdown of a previous operation of the fuel cell 1, a relative humidity a of the electrolyte membrane 23 estimated during a downtime (suspension) of the fuel cell 1, or a relative humidity $\alpha$ of the electrolyte membrane 23 estimated at the fuel cell 1 immediately before the upcoming estimation.

Figure 11:
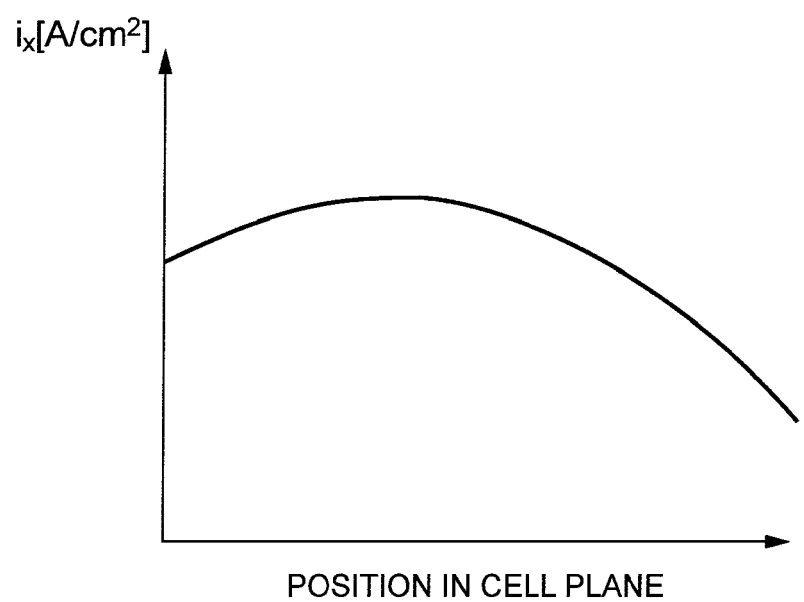
FIG. 11 shows current density with respect to the location in the cell plane according to the embodiment.

In step S4 illustrated in FIG. 8, a current density $i_x$ (where x is any natural number) is calculated using a map from the water transfer rate $V_{H2O,\,CA\to AN}$, the dew point $T_{d,\,CA}$, the dew point $T_{d,\,AN}$, the temperature $T_{OUT,\,i}$, the air back pressure $P_{air,\,i}$, the hydrogen pressure $P_{H2,\,i}$, the air flow rate $Q_{air,\,i}$, the hydrogen flow rate $Q_{H2,\,i}$, and the current value I. The current density $i_x$ is a current density over an arbitrary area in the cell plane. For example, if respective areas for x=4 are to be denoted as $s_1$ to $s_4$, then $I=i_1\times s_1+i_2\times s_2+i_3\times s_3+i_4\times s_4$. An example of a calculation result of a distribution of the current density $i_x$ is illustrated in FIG. 11.

In addition, a current distribution and a relative humidity distribution in a cell plane are calculated in step S4. Functions I and RH which represent the distributions may be expressed as follows. Moreover, sensitivities of the functions I and RH with respect to each parameter ($T_{d,\,CA}$, $T_{d,\,AN}$, $T_{OUT,\,i}$, $P_{air,\,i}$, $P_{H2,\,i}$, $Q_{air,\,i}$, $Q_{H2,\,i}$, $V_{H2O,\,CA\to AN}$, $i_x$) are to be mapped in advance. In addition, an overvoltage distribution in the cell plane may also be calculated based on the parameters.

$$I=f(T_{d,CA},T_{d,AN},T_{OUT,i},P_{air,i},P_{H2,i},Q_{air,i},Q_{H2,i},\\V_{H2O,CA\to AN},i_x)$$

$$RH=f(T_{d,CA},T_{d,AN},T_{OUT,i},P_{air,i},P_{H2,i},Q_{air,i},Q_{H2,i},\\V_{H2O,CA\to AN},i_x)$$

Figure 12:
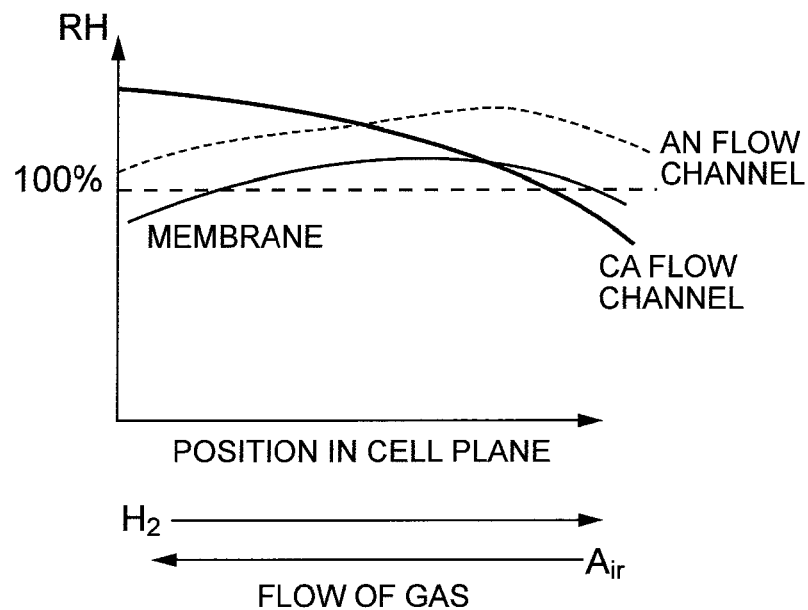
FIG. 12 shows relative humidity distributions of reactant gas flow channels in the cell plane and electrolyte membrane according to the embodiment.

FIG. 12 is a diagram illustrating an example of relative humidity distributions (relative humidity distributions of the reactant gas flow channel and the electrolyte membrane) in a cell plane calculated in step S4. In the present embodiment, a counterflow flow channel mode is taken as an example so that flows of hydrogen gas and air are shown in relation to a position in a cell plane in FIG. 12. As illustrated in FIG. 12, while relative humidity has exceeded 100% and is in a supersaturated state from the hydrogen inlet 27a to the hydrogen outlet 27b in an AN flow channel (the hydrogen flow channel 25A), relatively humidity is below 100% on the side of the air outlet 28b in a CA flow channel (the air flow channel 25B). In addition, a central part (a central part of the single cell 2) of the electrolyte membrane 23 is in a supersaturated state.

In step S5 illustrated in FIG. 8, a degree of supersaturation $\sigma_1$ (an amount corresponding to relative humidity over 100%) and a degree of undersaturation $\sigma_2$ (an amount corresponding to relative humidity under 100%) are respectively calculated for the anode side and the cathode side from the relative humidity distribution result illustrated in FIG. 12, and a liquid water generation rate $V_{vap\to liq}$ and a liquid water evaporation rate $V_{liq\to vap}$ are calculated from the expressions given below. $V_{vap\to liq}$ and $V_{liq\to vap}$ in the hydrogen flow channel 25A and the air flow channel 25B are respectively calculated in consideration of the fact that phases (gas phase, liquid phase) of water vary in the reactant gas flow channel.

$$V_{vap\to liq}=k_1\times\sigma_1$$

$$V_{liq\to vap}=k_2\times\sigma_2$$

In the above expressions, coefficients $k_1$, $k_2$ represent factors due to temperature and water repellency and attributable to properties of the reactant gas flow channel. The coefficients $k_1$, $k_2$ are to be mapped in advance from an experiment.

In step S6 illustrated in FIG. 8, a water transfer rate V_liq in the reactant gas flow channel is respectively calculated for the anode side and the cathode side from the following expression. Respective water transfer rates V_liq in the hydrogen flow channel 25A and the air flow channel 25B are calculated in consideration of the fact that liquid water is blown away and discharged from inside the cell plane by the flow of reactant gas in the reactant gas flow channel.

$$V\_liq=k_3\times V\_gas$$

In this case, the water transfer rate V_liq refers to a transfer rate of liquid water blown away by the reactant gas. In addition, V_gas denotes a water vapor flow rate in the reactant gas flow channel. A value calculated from a map related to a state quantity such as a supply flow rate of reactant gas and water vapor partial pressure is to be used. The coefficient $k_3$ represents a factor due to temperature or water repellency and attributable to properties of the reactant gas flow channel. The coefficient $k_3$ is to be mapped in advance from an experiment.

Figure 13:
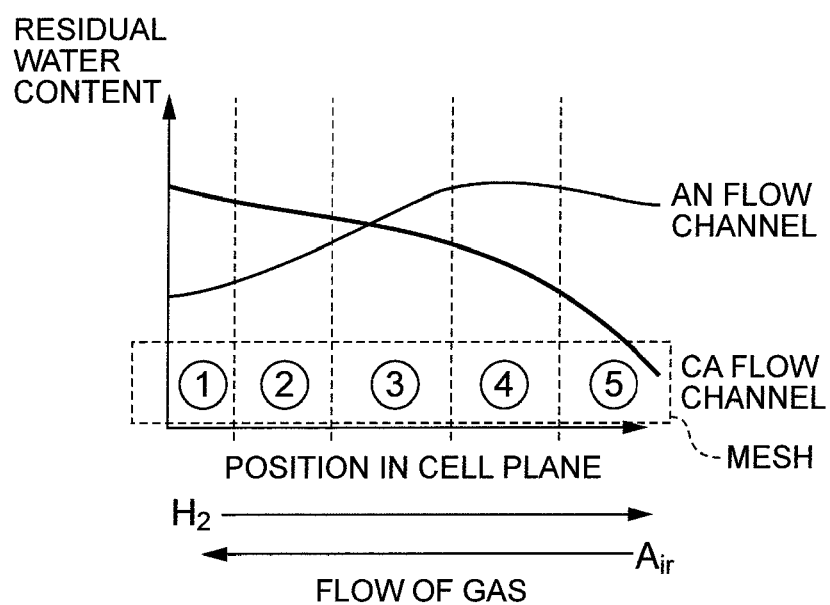
FIG. 13 shows a residual water content distribution in the cell plane according to the embodiment.

FIG. 13 is a diagram illustrating an example of a residual water content distribution in a cell plane calculated in steps S4 to S6. The residual water content distribution is determined by taking into consideration the variation of liquid water in the reactant gas flow channel (in other words, $V_{vap\to liq}$, $V_{liq\to vap}$, and V_liq calculated in steps S5 and S6 described above) in addition to the relative humidity distribution (FIG. 12) in the reactant gas flow channel calculated in step S4. As can be understood from FIG. 13, in the hydrogen flow channel 25A, the residual water content is higher on the side of the hydrogen outlet 27b than the side of the hydrogen inlet 27a, and in the air flow channel 25B, the residual water content gradually drops toward the side of the air outlet 28b. Moreover, although not diagrammatically illustrated, a moisture content distribution in a cell plane can be determined from the relative humidity distribution (FIG. 12) of the electrolyte membrane 23 calculated in step S4 and is to approximate the relative humidity distribution.

From the procedure described above, variations (water balance) in a residual water content and a moisture content of a single cell $2_i$ in a given calculation time can be calculated and a residual water content distribution of the hydrogen flow channel 25A, a residual water content distribution of the air flow channel 25B, and a moisture content distribution of the electrolyte membrane 23 can be determined. Water balance in a cell plane can be calculated based on a coarseness of a mesh with sensitivity (for example, the five meshes illustrated in FIG. 13). Accordingly, how much residual water content and moisture content exist in which portion can be estimated with high accuracy.

2. Consideration of Temperature Variation and Flow Distribution Variation in Cell Lamination Direction During Estimation $T_{IN, I}$, $T_{OUT, I}$, $P_{air, I}$, $P_{H2, I}$, $Q_{air, I}$ and $Q_{H2, I}$ of each single cell $2_i$ are to be determined as follows.

(1) Calculation of Cell Inlet Temperature $T_{IN, i}$

As illustrated in FIG. 14, first, a stack inlet temperature $T_{in}$, a coolant flow rate $Q_{LLC}$, an external air temperature $T_{external\ air}$, and a vehicle speed $V_{vehicle\ speed}$ are read (step S11). In this case, $T_{in}$ is a detected value by the temperature sensor T1. $Q_{LLC}$ is a flow rate of the coolant to be supplied to the fuel cell 1 and can be estimated from the number of revolutions of the cooling pump 50 and other detected values. Alternatively, a flow rate sensor may be provided at the coolant flow channel 51 and a detected value by the flow rate sensor may be used. $T_{external\ air}$ is a detected value by the external air temperature sensor 62 and $V_{vehicle\ speed}$ is a detected value by the vehicle speed sensor 63.

Generally, in the cell laminate 3, the further away from the supply port 14 of the reactant gas or, in other words, the greater the cell channel "I," the greater the heat discharge. In addition, the influence of heat discharge varies depending on the coolant flow rate, the external air temperature, and the vehicle speed. For example, as illustrated in FIG. 15A, the greater the coolant flow rate $Q_{LLC}$ ($Q_1 > Q_2$), the less the stack inlet temperature $T_{IN}$ is influenced by heat discharge. In other words, the cell inlet temperature $T_{IN, I}$ can be prevented from dropping below the stack inlet temperature $T_{IN}$. In addition, as illustrated in FIG. 15B, the higher the $T_{external\ air}$ ($T_{external\ air\ 1} > T_{external\ air\ 1}$), the less the stack inlet temperature $T_{IN}$ is influenced by heat discharge.

Therefore, in consideration of such declines in coolant temperature due to heat discharge, the cell inlet temperature $T_{IN, I}$ is to be calculated as a function expressed as follows (step S12).

$$T_{IN, I} = f(Q_{LLC}, T_{IN}, T_{external\ air}, V_{vehicle\ speed})$$

Accordingly, a cell inlet temperature $T_{IN, I}$ corresponding to the cell channel I can be calculated from the respective values of $Q_{LLC}$, $T_{IN}$, $T_{external\ air}$, and vehicle speed described above.

Figure 16:
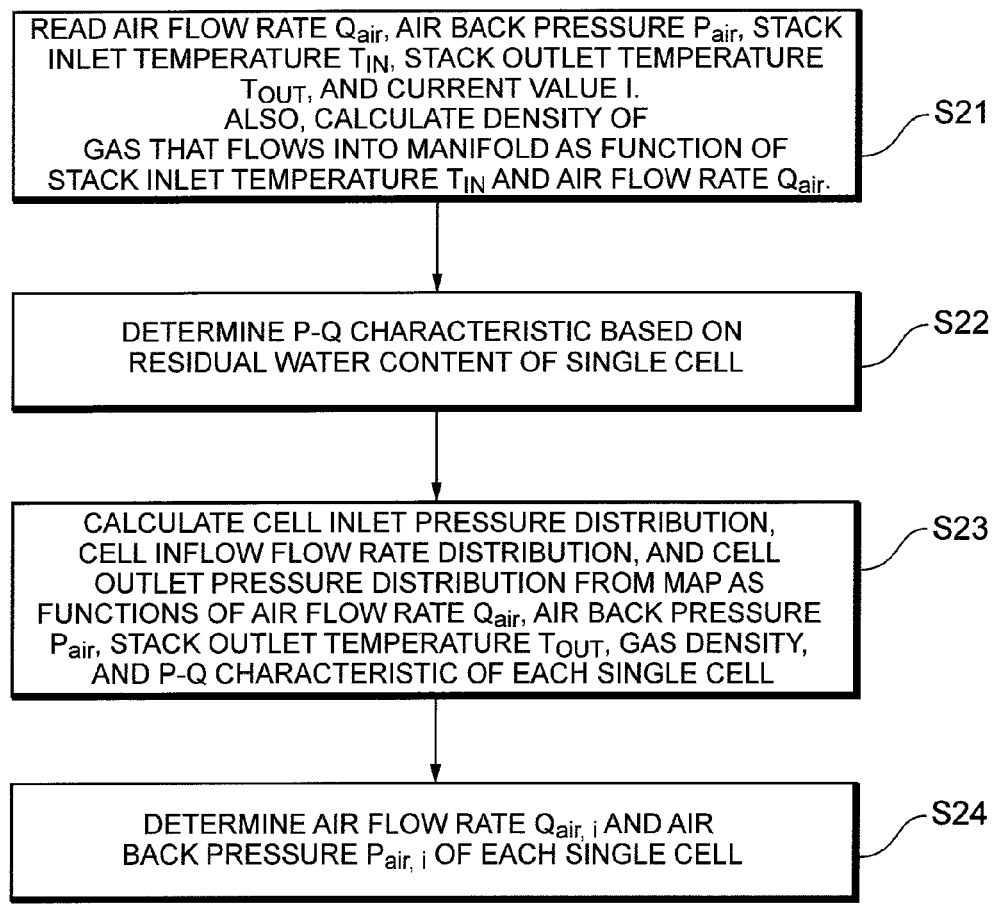
FIG. 16 is a flow chart showing a method for calculating air flow rate and air back pressure of each single cell according to the embodiment.

(2) Calculation of Air Flow Rate $Q_{air, I}$ and Air Back Pressure $P_{air, i}$ As illustrated in FIG. 16, first, an air flow rate $Q_{air}$, an air back pressure $P_{air}$, a stack inlet temperature $T_{IN}$, a stack outlet temperature $T_{OUT}$, and a current value I are read (step S21). In this case, the air flow rate $Q_{air}$, the air back pressure $P_{air}$, and the stack outlet temperature $T_{OUT}$ are respective detected values of the flow rate sensor F1, the pressure sensor P1, and the temperature sensor T2. In addition, in step S21, a gas density of air that flows into the manifold 15a is calculated as a function of the stack inlet temperature $T_{IN}$ and the air flow rate $Q_{air}$.

Figure 17:
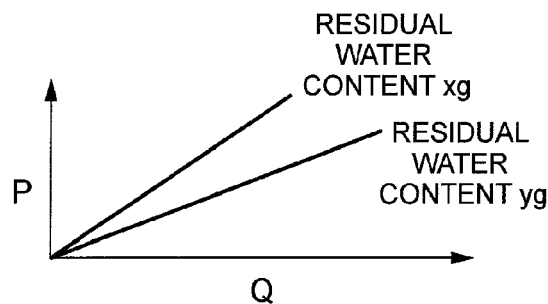
FIG. 17 is a map showing P-Q characteristics of a single cell depending on a residual water content according to the embodiment.

In the following step S22, a P-Q characteristic (a characteristic representing a relationship between air back pressure and air flow rate) of a single cell $2_i$ is determined based on the residual water content of the single cell $2_i$. For example, a map representing a P-Q characteristic (pressure-flow rate characteristic) corresponding to a plurality of residual water contents (x>y) such as that illustrated in FIG. 17 is to be acquired in advance, and a P-Q characteristic corresponding to an immediately previous residual water content (a total amount of the cathode-side residual water content of the single cell $2_i$) calculated by the flow illustrated in FIG. 8 is determined.

Figure 18A:
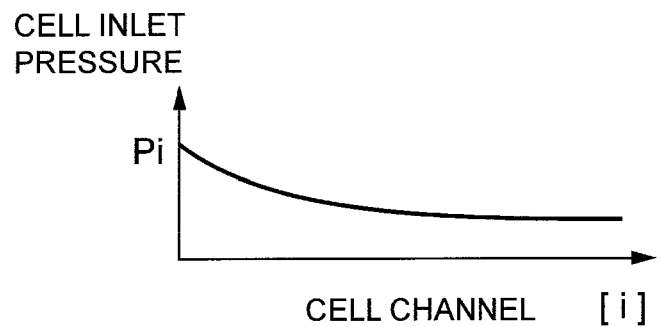
FIG. 18A shows the cell inlet pressure distribution according to the embodiment.
Figure 18B:
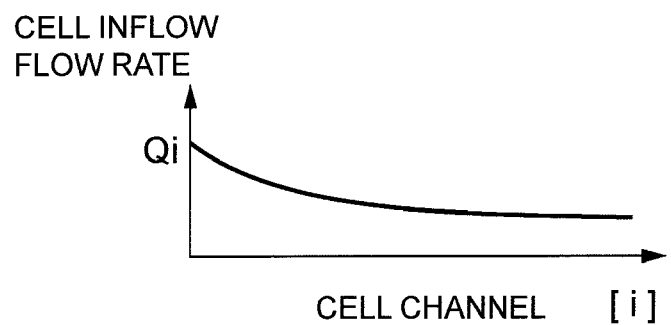
FIG. 18B shows the cell inflow rate distribution according to the embodiment.
Figure 18C:
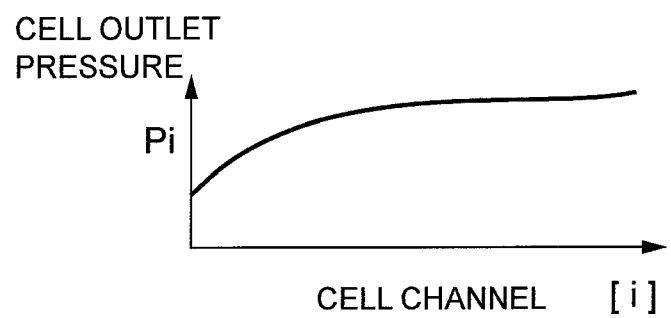
FIG. 18C shows the cell outlet pressure distribution according to the embodiment.

Next, a cell inlet pressure distribution, a cell inflow flow rate distribution, and a cell outlet pressure distribution are calculated from a map as functions of the air flow rate $Q_{air}$, the air back pressure $P_{air}$, the stack outlet temperature $T_{OUT}$ the gas density calculated above, and the P-Q characteristic of each single cell 2, (step S23). An example of the distributions are as illustrated in FIGS. 18A to 18C. In this case, since the cell inflow flow rate illustrated in FIG. 18B and the cell outlet pressure illustrated in FIG. 18C correspond to an air flow rate $Q_{air, i}$ and an air back pressure $P_{air, i}$ of the cell channel i, respective values thereof can be determined (step S24).

Moreover, although a detailed description will not be given, a hydrogen flow rate $Q_{H2, I}$ and a hydrogen pressure $P_{H2, I}$ of the single cell $2_i$ can also be calculated by the same method as used for the calculations of the air flow rate $Q_{air, I}$ and the air back pressure $P_{air, i}$. In this case, since the cell inlet pressure illustrated in FIG. 18A corresponds to the hydrogen pressure $P_{H2, I}$ and the cell inflow flow rate illustrated in FIG. 18B corresponds to the hydrogen flow rate $Q_{H2, I}$, respective values thereof can be determined.

(3) Calculation of Cell Outlet Temperature $T_{OUT, I}$

Figure 19:
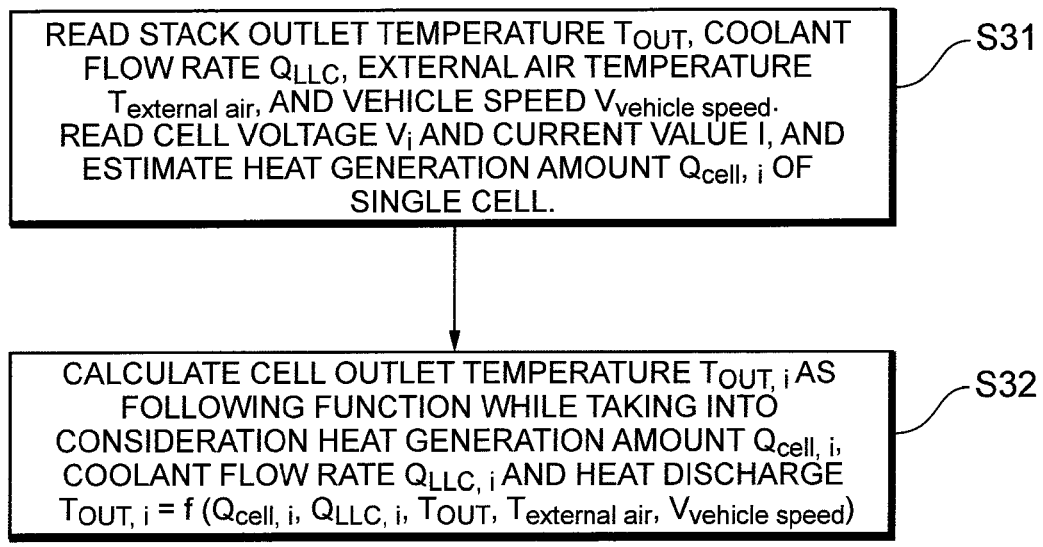
FIG. 19 is a flow chart showing a method for calculating the cell outlet temperature according to the embodiment.

As illustrated in FIG. 19, first, a stack outlet temperature $T_{OUT}$ is read as a detected value of the temperature sensor T2 (step S31). In addition, a coolant flow rate $Q_{LLC}$, an external air temperature $T_{external\ air}$, and a vehicle speed $V_{vehicle\ speed}$ are read in the same manner as in the case of the stack inlet temperature $T_{IN}$ described above. Furthermore, a cell voltage $V_I$ and a current value I are read, and a heat generation amount $Q_{cell, I}$ of each single cell $2_i$ is estimated from an I-V characteristic of each single cell $2_i$.

In this case, a voltage value of each single cell 2, detected by a cell monitor, not illustrated, can be used as the cell voltage $V_i$. However, instead of using a sensor such as a cell monitor, the cell voltage $V_i$ can also be estimated by having each single cell $2_i$ retain an I-V map (dependent on an electric-generating capacity, an air flow rate, a hydrogen flow rate, an air back pressure, and a hydrogen pressure). Moreover, the heat generation amount $Q_{cell, I}$ is attributable to heat generation by $T\Delta S$ and heat loss due to overvoltage.

Figure 20:
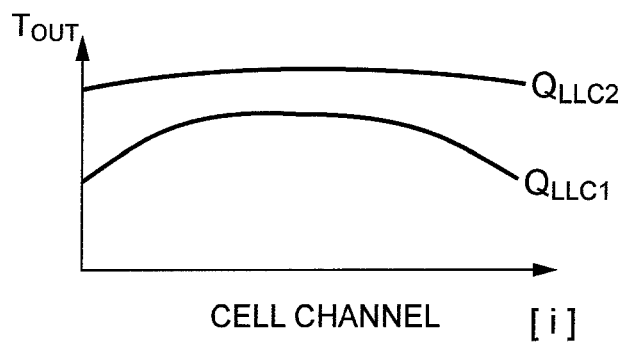
FIG. 20 shows an effect of heat radiation on the stack outlet temperature as a relation between the location of a single cell and coolant flow rate, according to the embodiment.

In the same manner as the stack inlet temperature $T_{IN}$ described above, the stack outlet temperature $T_{OUT, i}$ is also influenced by heat discharge depending on the position of the single cell $2_i$ in the cell laminate 3. For example, as illustrated in FIG. 20, the greater the coolant flow rate $Q_{LLC}$ ($Q_{LLC1} < Q_{LLC2}$), the less the stack outlet temperature $T_{OUT}$ is influenced by heat discharge.

Therefore, the coolant flow rate $Q_{LLC, I}$ and heat discharge are taken into consideration in addition to the heat generation amount $Q_{cell, I}$, and the cell outlet temperature $T_{OUT, I}$ is to be calculated as a function expressed as follows (step S32).

$$T_{OUT, I} = f(Q_{cell, I}, Q_{LLC, I}, T_{OUT}, T_{external\ air}, V_{vehicle\ speed})$$

Accordingly, a cell outlet temperature $T_{OUT, I}$ corresponding to the cell channel I can be calculated from respective detected values or estimated values represented by the parameters.

Moreover, $Q_{LLC, i}$ is a coolant flow rate to be supplied to each single cell 2 and takes into consideration a flow distribution variation with respect to the coolant flow rate $Q_{LLC}$ described earlier in a case where a single fuel cell stack 1 is assumed. More specifically, by creating in advance a map representing a relationship between the coolant flow rate $Q_{LLC}$ and the cell channel i for each of several coolant flow rates $Q_{LLC}$, a $Q_{LLC, i}$ corresponding to the cell channel i can be calculated.

According to the procedures (1) to (3) described above, values that take into consideration a temperature distribution (a variation in heat discharge or the like) and pressure drop distribution (flow distribution variations of oxidation gas, fuel gas, coolant, or the like) can be used for state quantities of each single cell $2_i$ in the flows (steps S1, S2, and S4) illustrated in FIG. 8. Accordingly, compared to a case where the fuel cell 1 is singularly perceived as a stack, a residual water content distribution and a moisture content distribution can be estimated with high accuracy for all single cells 2 (in other words, in a cell lamination direction).

D. Control Example Using Estimation Results

Typical variations in residual water content will first be described in each of shutdown, standstill, and restart patterns of the fuel cell system 100, and then a control example using estimation results according to the above estimating method.

FIG. 21 shows an example of changes in residual water content in the single cell 2 over time without implementing the control example according to the embodiment.

As shown in FIG. 21, in the section corresponding to the operating duration of the fuel cell system 100 (until time $t_1$), the residual water content on the cathode side is larger than the residual water content on the anode side. The reason is that water is generated as electricity is generated in the single cell 2 on the cathode side, as described above. After the fuel cell system 100 is shut down at time $t_1$ and in the subsequent standstill section (time $t_1$-$t_2$), water moves from the cathode side to the anode side due to water vapor partial pressure difference (temperature difference), and the levels of residual water content on the cathode side and the anode side can cross over to each other. In addition, the residual water content on the anode side at the time of system shutdown (time $t_1$) may be larger than that at the time of system restart (time $t_2$).

Figure 22A:
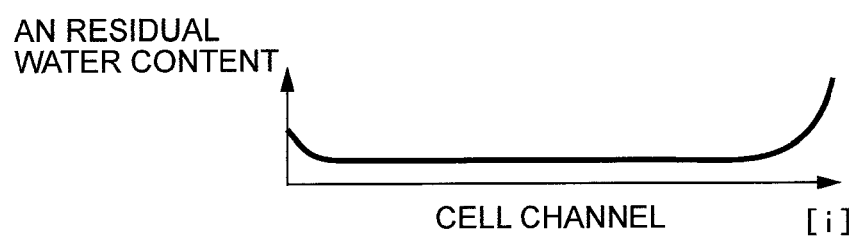
FIG. 22A shows an example of a residual water content distribution in a hydrogen flow channel at the time of system restart when the cell laminate shown in FIG. 9 is used as a model.
Figure 22B:
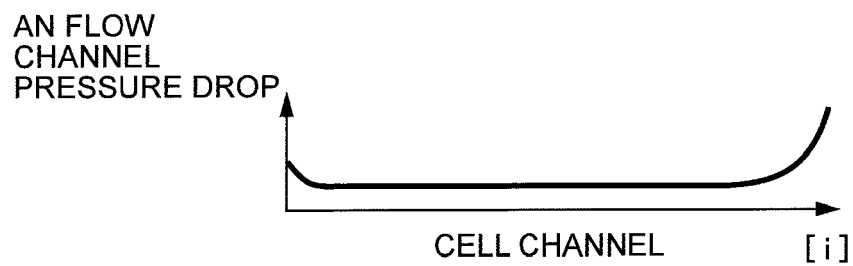
FIG. 22B shows an example of a pressure drop distribution in a hydrogen flow channel at the time of system restart when the cell laminate shown in FIG. 9 is used as a model.

FIGS. 22A and 22B show examples of a residual water content distribution and a pressure drop distribution in the hydrogen flow channel 25A at the time of system restart (time $t_2$) when the cell laminate 3 shown in FIG. 9 is used as a model.

As shown in FIG. 22A, it can be seen that the residual water content is larger near end cells 2a, and the residual water content is smaller at single cells 2 at the center in the cell lamination direction (hereinafter referred to a "primary cell 2b," see FIG. 9). In particular, the residual water content in an end cell 2a on the far side in the cell lamination direction (or on the downstream side in the supply direction of reactant gas in the cell laminate 3) is larger than that in an end cell 2a on the near side in the cell lamination direction. The larger the residual water content is, the more hydrogen gas flow is prevented; therefore, pressure drop in the hydrogen flow channel 25A increases (see FIG. 22B).

Referring again to FIG. 21, if the fuel cell system 100 is restarted with a high pressure drop in the hydrogen flow channel 25A (time $t_2$), the supply flow rate of hydrogen gas to the anode electrode 24A may be insufficient. In particular, with a rapid power ramp request such as WOT (Wide Open Throttle) with the fuel cell system 100 mounted onboard, it is likely that cell voltage drop may occur due to an insufficient supply flow rate (or lack of hydrogen), eventually resulting in degradation of MEA 20. For this reason, in order to suppress insufficient supply of hydrogen gas at the time of system restart, remaining water in the single cell 2 may advantageously be discharged after system shutdown.

The control example, therefore, is adapted to use an accurate estimation result according to the above estimating method to perform an optimum scavenging process in consideration of a water distribution in the fuel cell 1. This control associated with scavenging process is performed by the operation control unit 68 in response to a signal received from the estimating unit 67.

FIG. 23 is a timing chart illustrating a scavenging process after system shutdown according to the control example. The axis of ordinates of FIG. 23(A) shows a residual water content in the air flow channel 25B, and the axis of ordinates of FIG. 23(B) shows an air supply flow rate. In addition, a residual water content $W_1$ shows the residual water content at which water blockage may occur in single cells 2, and when it is exceeded after system shutdown, insufficient supply of hydrogen gas may occur at the time of system restart. In the control example, scavenging processes are performed after system shutdown until a residual water content in the air flow channel 25B of each single cell 2 falls below the residual water content $W_1$.

In particular, the fuel cell system 100 is normally operated first at an air supply flow rate, which is a constant base flow rate $Q_1$, until time $t_1$ at which the fuel cell system 100 is shut down. After system shutdown or vehicle stop, or at time $t_1$, a scavenging process is started. This scavenging process is implemented by supplying air through the compressor 33 while supply of hydrogen gas to the fuel cell 1 is suspended to remove liquid water in the air flow channel 25B by means of air. At this time, in order to increase the removal, the air supply flow rate may be increased from the base flow rate $Q_1$ to a scavenging flow rate $Q_2$. Note that the higher the value of the air supply flow rate $Q_2$ is, the larger the noise of the compressor 33 becomes, and the value of the air supply flow rate $Q_2$, therefore, should be determined on the basis of the NV evaluation.

When a residual water content in the air flow channel 25B is reduced to the residual water content $W_1$ by the scavenging process (time $t_2$), the supply of air is stopped and the scavenging process is terminated. Thereafter, the fuel cell system 100 is left standstill until it is restarted. As described above, while the system is in standstill, remaining water in the air flow channel 25B moves to the anode side due to the water vapor partial pressure difference.

Here, a duration of a scavenging process, scavenging time $T_{SCA}$ can be represented by the following equation:

scavenging time $T_{SCA}$=time $t_2$–time $t_1$.

The scavenging time $T_{SCA}$ is not always constant and is determined based on an estimation result from the estimating unit 67. For example, when the estimated residual water content is relatively large, a longer scavenging time $T_{SCA}$ is set, while when the estimated residual water content is relatively small, a shorter scavenging time $T_{SCA}$ is set. As an example, the length of the scavenging time $T_{SCA}$ can be set based on the estimated (total) residual water content in the air flow channel 25B in any or all of single cells 2. As another example, the length of the scavenging time $T_{SCA}$ can be set based on the estimated (total) residual water content in the hydrogen flow channel 25A in any or all of single cells 2. Alternatively, the length of the scavenging time $T_{SCA}$ can be set based on a sum (hereinafter referred to the "estimated sum of residual water content") of the estimated (total) residual water content in the air flow channel 25B added to the estimated (total) residual water content in the hydrogen flow channel 25A in any or all of single cells 2.

For setting scavenging time $T_{SCA}$, the residual water content $W_1$ for a threshold varies depending on which estimation of a residual water content is used. For example, when the estimated sum of residual water content is used, a residual water content $W_1$ having a value larger than that used when only the estimated residual water content either in the air flow channel 25B or in the hydrogen flow channel 25A is used. Additionally, the residual water content $W_1$ may also be varied depending on the location of a single cell 2 in the cell lamination direction. This is because an end cell 2a tends to have a larger amount of residual water content than a primary cell 2b, as shown in FIG. 22A.

As a preferred example of the control example, a scavenging time $T_{SCA}$ may be set based on the estimated residual water content (at least one of anode-side residual water content, cathode-side residual water content, and total amount thereof) in an end cell 2a on the far side in the cell lamination direction. The reason is that because the residual water content (estimation) in the end cell 2a has the largest value among single cells 2 in the cell laminate 3, the value can be referenced in setting a scavenging time $T_{SCA}$ so as to reliably reduce the residual water content in other single cells 2 in addition to the end cell 2a.

In this case, it is more preferable to depend on the estimated sum of residual water content in the end cell 2a. Then the threshold (residual water content $W_1$) to be compared with the estimated sum of residual water content may advantageously be set to a value at which cell voltage drop may not occur. Therefore, even when all of the estimated remaining water in the end cell 2a has transferred into the hydrogen flow channel 25A, scavenging processes may advantageously be performed until the transferred residual water content reaches a value at which cell voltage drop may not occur. In this way, even when all of remaining water in single cells 2 has transferred to the anode side at the time of system restart, cell voltage drop can be avoided.

For an estimation used in setting a scavenging time $T_{SCA}$, a value estimated at the time of system shutdown (time $t_1$) or slightly earlier may be used. As a preferred example, however, it may be advantageous to estimate a residual water content distribution as described above even during a scavenging process after system shutdown, and to monitor whether or not the residual water content estimated during the scavenging process falls below the threshold as described above (residual water content $W_1$). If it falls below the threshold, the scavenging process may be terminated. In this way, a residual water content can be reduced on the basis of the progress of the scavenging process and a scavenging time can be further optimized.

Figure 24A:
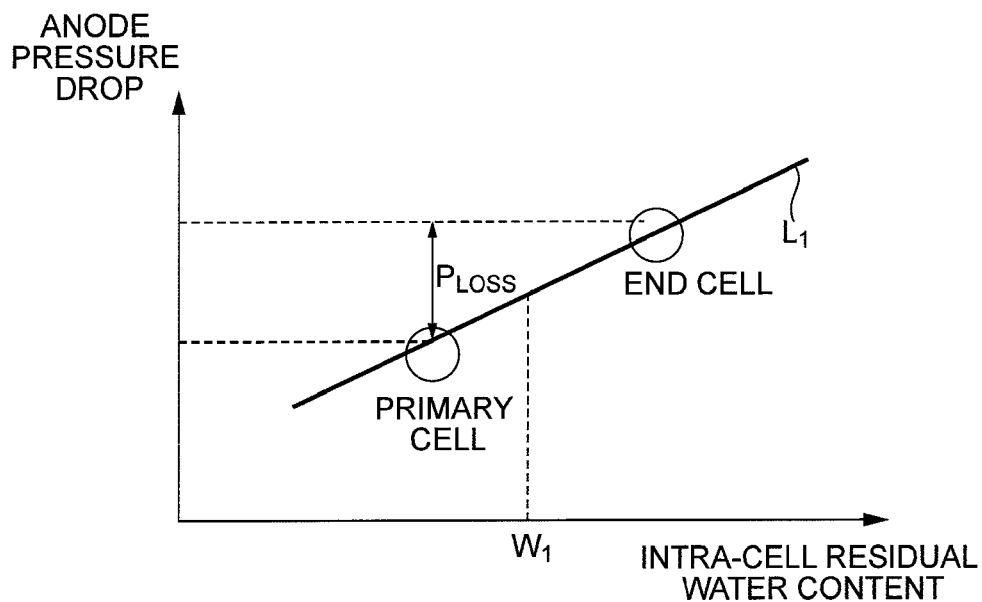
FIG. 24A shows a relation between an intra-cell residual water content and the anode pressure drop before scavenging process according to the embodiment.
Figure 24B:
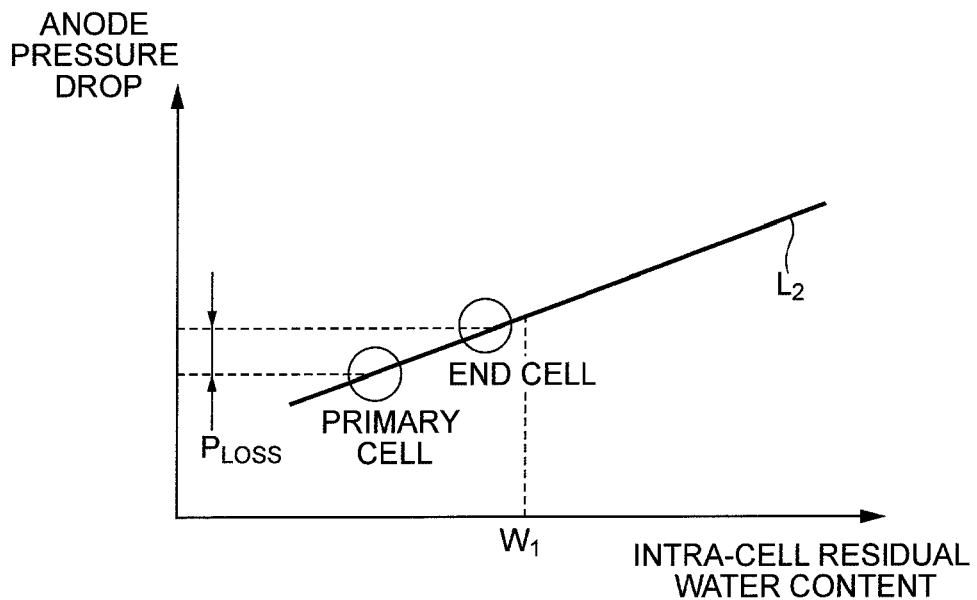
FIG. 24B shows a relation between an intra-cell residual water content and the anode pressure drop after scavenging process according to the embodiment.

FIGS. 24A and 24B show a relation between an intra-cell residual water content and anode pressure drop for pre- and post-scavenging process, respectively.

Here, the intra-cell residual water content on the axis of abscissas represents the sum of the estimated residual water content in the hydrogen flow channel 25A and the estimated residual water content in the air flow channel 25B in the single cells 2. Assuming that all of remaining water in the air flow channel 25B moves to the hydrogen flow channel 25A after the system has been left standstill, the intra-cell residual water content may be considered to be equal to a residual water content in the hydrogen flow channel 25A after the system has been left standstill or at the time of system restart after a certain time has passed since system shutdown. In addition, anode pressure drop on the axis of ordinates represents pressure drop in the hydrogen flow channel 25A. Further, lines $L_1$ and $L_2$ indicate a characteristic of a single cell 2 experimentally obtained in advance and there are estimates plotted for the end cell 2a and the primary cell 2b. Note that values will be plotted between the two plotted values with respect to a plurality of single cells 2 between the end cell 2a and the primary cell 2b.

At pre-scavenging process as shown in FIG. 24A, a large anode pressure drop difference $P_{Loss}$ between the end cell 2a and the primary cell 2b is evident. This may cause an inadequate hydrogen gas distribution to the end cell 2a, and the hydrogen gas flow rate may be insufficient in the end cell 2a.

At post-scavenging process as shown in FIG. 24B, the intra-cell residual water content in the end cell 2a falls below the threshold (residual water content $W_1$). In addition, a small anode pressure drop difference $P_{Loss}$ between the end cell 2a and the primary cell 2b is evident. With this small anode pressure drop difference $P_{Loss}$, the inadequate hydrogen gas distribution to the end cell 2a is suppressed, so that insufficient hydrogen gas flow rate in the end cell 2a is suppressed.

As described above, since the control example according to the embodiment uses an accurate estimation result on a water distribution, an optimum scavenging time can be set after system shutdown. This allows an appropriate scavenging process to be performed before system restart, and remaining water moving from the air flow channel 25B to the hydrogen flow channel 25A after system shutdown can be reduced. Therefore, remaining water-induced effects such as insufficient supply of hydrogen gas can be suppressed at the time of system restart.

In another embodiment, an anode-side scavenging process may be performed instead of a cathode-side scavenging process. In this scavenging process, for example, the hydrogen pump 46 may be rotated to remove liquid water in the hydrogen flow channel 25A with the pumped gas. With this scavenging process, the amount of remaining water originally present in the hydrogen flow channel 25A can be reduced, so that the residual water content in the hydrogen flow channel 25A can be reduced before system restart. Therefore, also in this case, remaining water-induced effects such as insufficient supply of hydrogen gas can be suppressed at the time of system restart.

As shown in FIG. 21, however, since the air flow channel 25B tends to have a larger amount of residual water content than the hydrogen flow channel 25A while the fuel cell system 100 is operated, the cathode-side scavenging process is more effective than the anode-side scavenging process. The description of scavenging time setting and other procedures for anode-side scavenging process will be omitted because they are similar to those for cathode-side scavenging process.

In another embodiment, scavenging process can also be performed by supplying inert gas (e.g. nitrogen) to a reactant gas flow channel (at least one of the hydrogen flow channel 25A, the air flow channel 25B, and both of them). For scavenging time setting and other procedures in this case, similar procedures for cathode-side scavenging process can also be applied.

Further in another embodiment, instead of setting only scavenging time based on an estimation result for a residual water content, scavenging flow rate (such as air supply flow rate $Q_2$ as described above) can be set.

DESCRIPTION OF SYMBOLS

1: fuel cell
2: single cell
2a: primary cell
2b: end cell
23: electrolyte membrane
24A: anode electrode
24B: cathode electrode
25A: hydrogen flow channel (fuel gas flow channel)
25B: air flow channel (oxidation gas flow channel)
67: estimating unit
68: operation control unit
100: fuel cell system
300: air piping system
400: hydrogen piping system
500: coolant piping system
600: controller

The invention claimed is:

1. A fuel cell system comprising:
a fuel cell having a cell laminate formed by laminating a plurality of single cells, each of the single cells having an anode electrode, a cathode electrode, an electrolyte membrane existing between the anode electrode and the cathode electrode, and a fuel gas flow channel for supplying fuel gas to the anode electrode and an oxidation gas flow channel for supplying oxidation gas to the cathode electrode, and
a controller being programmed to estimate residual water content distributions in the fuel gas flow and oxidation gas flow channels in a cell plane of each single cell while taking into consideration water transfer that occurs between the anode electrode and the cathode electrode via the electrolyte membrane, and the controller programmed to set, based on at least one of the estimated residual water content in the fuel gas flow channel, the estimated residual water content in the oxidation gas flow channel, and total amount thereof, a scavenging time used in a scavenging process for the fuel cell after the fuel cell system is shut down.

2. The fuel cell system according to claim 1, wherein even when all of the estimated remaining water in single cells has transferred to the anode electrode side, the controller is programmed to perform scavenging processes until the transferred residual water content reaches a value at which cell voltage drop may not occur.

3. The fuel cell system according to claim 2, wherein the controller is programmed to perform the scavenging process with reference to estimated remaining water in a single cell at an end of the cell laminate.

4. The fuel cell system according to claim 1, wherein the controller is programmed to estimate the residual water content distributions even during the scavenging process such that the controller is programmed to terminate the scavenging process when the residual water content estimated during the scavenging process falls below a predetermined threshold.

5. The fuel cell system according to claim 1, wherein the controller is programmed to perform the scavenging process on the oxidation gas flow channel.

6. The fuel cell system according to claim 1, wherein the controller is programmed to perform the scavenging process on the fuel gas flow channel.

7. The fuel cell system according to claim 1, wherein the controller is further programmed to determine a water transfer rate between the anode electrode and the cathode electrode when estimating the residual water content distributions.

8. The fuel cell system according to claim 1, wherein the controller is further programmed to calculate a cathode electrode dew point and an anode electrode dew point when estimating the residual water content distributions.

* * * * *

UNITED STATES PATENT AND TRADEMARK OFFICE
CERTIFICATE OF CORRECTION

PATENT NO. : 8,691,458 B2  
APPLICATION NO. : 13/106629  
DATED : April 8, 2014  
INVENTOR(S) : M. Okuyoshi et al.

Page 1 of 1

It is certified that error appears in the above-identified patent and that said Letters Patent is hereby corrected as shown below:

In the Specification

At column 9, line 35, change "a relative humidity a" to -- a relative humidity α --.

At column 9, line 37, change "a relative humidity a" to -- a relative humidity α --.

At column 10, line 9, change "relatively humidity" to -- relative humidity --.

At column 11, line 46, change "($T_{external\ air\ 1} > T_{external\ air\ 1}$)" to -- ($T_{external\ air\ 1} > T_{external\ air\ 2}$) --.

Signed and Sealed this  
Twenty-first Day of October, 2014

Michelle K. Lee  
*Deputy Director of the United States Patent and Trademark Office*